US011246024B2

(12) United States Patent
Mullen

(10) Patent No.: US 11,246,024 B2
(45) Date of Patent: *Feb. 8, 2022

(54) SYSTEMS AND METHODS FOR LOCATING CELLULAR PHONES AND SECURITY MEASURES FOR THE SAME

(76) Inventor: Jeffrey David Mullen, Pittsburgh, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 11/841,765

(22) Filed: Aug. 20, 2007

(65) Prior Publication Data

US 2007/0281671 A1    Dec. 6, 2007

Related U.S. Application Data

(63) Continuation of application No. 10/400,296, filed on Mar. 25, 2003.

(60) Provisional application No. 60/367,967, filed on Mar. 25, 2002.

(51) Int. Cl.
| | |
|---|---|
| *H04M 11/00* | (2006.01) |
| *H04M 11/04* | (2006.01) |
| *H04W 8/14* | (2009.01) |
| *H04W 64/00* | (2009.01) |
| *H04W 8/16* | (2009.01) |

(52) U.S. Cl.
CPC .............. *H04W 8/14* (2013.01); *H04W 64/00* (2013.01); *H04W 8/16* (2013.01)

(58) Field of Classification Search
CPC .......... H04W 8/14; H04W 64/00; H04W 8/16
USPC ..... 379/456.1–456.3, 457, 410, 404.1, 404.2
See application file for complete search history.

(56) References Cited

U.S. PATENT DOCUMENTS

| | | | |
|---|---|---|---|
| 4,654,879 | A | 3/1987 | Goldman et al. |
| 5,043,736 | A | 8/1991 | Darnell et al. |
| 5,086,390 | A | 2/1992 | Matthews |
| 5,097,416 | A | 3/1992 | Matthews |
| 5,197,092 | A | 3/1993 | Bamburak |

(Continued)

FOREIGN PATENT DOCUMENTS

| | | |
|---|---|---|
| WO | WO 99/000717 | 2/1999 |
| WO | WO 99/009775 | 2/1999 |

(Continued)

OTHER PUBLICATIONS

Wrolstad, Jay, "Sprint Claims First With E911-Capable Phone," newsfactor.com (as viewed at http://www.newsfactor.com/perl/story/13952.html on Jan. 22, 2007), Oct. 4, 2001).

(Continued)

*Primary Examiner* — William J Deane, Jr.

(57) ABSTRACT

Systems and methods for locating a cellular phone are provided. More particularly, systems and methods for providing the location of a requested user's cellular phone from a requesting user's device (e.g., a second cellular phone) based on access rights defined by the requested user. Location descriptions may be provided at a multitude of levels. For example, if a cellular phone, or an identity associated to (e.g., logged into) a cellular phone, has been given access rights to a cell phone's exact location for an indefinite amount of time, that cell phone can receive, on command, the exact location of the approved cell phone. Other levels of location information that can be granted include, for example, proximities, states, and countries.

78 Claims, 17 Drawing Sheets

(56) References Cited

U.S. PATENT DOCUMENTS

| | | |
|---|---|---|
| 5,305,201 A | 4/1994 | Matthews |
| 5,327,144 A | 7/1994 | Stilp et al. |
| 5,337,334 A | 8/1994 | Antero Alvesalo |
| 5,338,147 A | 8/1994 | Kucharczyk et al. |
| 5,341,410 A | 8/1994 | Aron et al. |
| 5,384,824 A | 1/1995 | Alvesalo |
| 5,442,805 A | 8/1995 | Sagars et al. |
| 5,479,482 A | 12/1995 | Grimes |
| 5,500,887 A * | 3/1996 | Jeon ................ H04W 60/00 455/456.2 |
| 5,502,757 A | 3/1996 | Bales et al. |
| 5,519,760 A | 5/1996 | Borkowski et al. |
| 5,537,460 A | 7/1996 | Holliday, Jr. et al. |
| 5,548,816 A | 8/1996 | DeVaney |
| 5,551,058 A | 8/1996 | Hutcheson et al. |
| 5,555,286 A | 9/1996 | Tendler |
| 5,719,563 A | 2/1998 | Thompson |
| 5,767,788 A | 6/1998 | Ness |
| 5,778,315 A | 7/1998 | Proietti |
| 5,796,634 A | 8/1998 | Craport et al. |
| 5,805,999 A | 9/1998 | Inoue |
| 5,815,538 A | 9/1998 | Grell et al. |
| 5,832,381 A | 11/1998 | Kauppi |
| 5,847,976 A | 12/1998 | Lescourret |
| 5,875,398 A | 2/1999 | Snapp |
| 5,889,474 A * | 3/1999 | LaDue ............. G07C 9/00111 340/10.41 |
| 5,890,062 A | 3/1999 | Courtney et al. |
| 5,920,820 A | 7/1999 | Qureshi et al. |
| 5,929,752 A | 7/1999 | Janky et al. |
| 5,950,125 A | 9/1999 | Buhrmann et al. |
| 5,961,569 A | 10/1999 | Craport et al. |
| 5,961,572 A | 10/1999 | Craport et al. |
| 5,978,747 A | 11/1999 | Craport et al. |
| 5,987,019 A * | 11/1999 | Raith et al. .................. 370/347 |
| 5,999,124 A | 12/1999 | Sheynblat |
| 6,023,241 A | 2/2000 | Clapper |
| 6,028,537 A | 2/2000 | Suman et al. |
| 6,032,042 A | 2/2000 | Kauppi |
| 6,035,189 A | 3/2000 | All-Vehmas |
| 6,035,198 A | 3/2000 | Wiehe |
| 6,038,446 A | 3/2000 | Courtney et al. |
| 6,047,051 A | 4/2000 | Ginzboorg |
| 6,049,711 A | 4/2000 | Ben-Yehezkel |
| 6,061,561 A | 5/2000 | Alanara et al. |
| 6,078,578 A * | 6/2000 | Matsumoto ................ 370/350 |
| 6,088,586 A * | 7/2000 | Haverty ............. H04W 64/00 455/422.1 |
| 6,091,959 A | 7/2000 | Souissi et al. |
| 6,138,003 A | 10/2000 | Kingdon et al. |
| 6,144,336 A | 11/2000 | Preston et al. |
| 6,157,841 A | 12/2000 | Bolduc et al. |
| 6,166,626 A | 12/2000 | Janky et al. |
| 6,173,182 B1 | 1/2001 | Cha |
| 6,201,803 B1 | 3/2001 | Munday et al. |
| 6,208,866 B1 | 3/2001 | Rouhollahzadeh et al. |
| 6,215,863 B1 * | 4/2001 | Bennett et al. .......... 379/221.09 |
| 6,236,359 B1 | 5/2001 | Watters et al. |
| 6,236,858 B1 | 5/2001 | Griffith |
| 6,240,069 B1 | 5/2001 | Alperovich |
| 6,246,376 B1 | 6/2001 | Bork et al. |
| 6,246,861 B1 | 6/2001 | Messier et al. |
| 6,256,543 B1 | 6/2001 | Camp |
| 6,256,498 B1 | 7/2001 | Ludwig |
| 6,259,923 B1 | 7/2001 | Lim et al. |
| 6,275,544 B1 * | 8/2001 | Aiello et al. .................. 375/326 |
| 6,275,771 B1 | 8/2001 | Berstis et al. |
| 6,311,060 B1 | 10/2001 | Evans et al. |
| 6,314,365 B1 | 11/2001 | Smith |
| 6,317,718 B1 | 11/2001 | Fano |
| 6,321,092 B1 | 11/2001 | Fitch et al. |
| 6,324,404 B1 | 11/2001 | Dennison et al. |
| 6,330,452 B1 | 12/2001 | Fattouche et al. |
| 6,360,101 B1 | 3/2002 | Irvin |
| 6,360,102 B1 * | 3/2002 | Havinis et al. ................ 455/457 |
| 6,360,167 B1 | 3/2002 | Millington et al. |
| 6,374,306 B1 | 4/2002 | Tognazzini |
| 6,377,565 B1 * | 4/2002 | Puckette, IV ................ 370/337 |
| 6,377,810 B1 * | 4/2002 | Geiger et al. ............... 455/456.2 |
| 6,393,274 B1 | 5/2002 | Peltonen |
| 6,397,065 B1 | 5/2002 | Huusko et al. |
| 6,400,946 B1 | 6/2002 | Vazvan |
| 6,400,956 B1 | 6/2002 | Richton |
| 6,408,186 B1 | 6/2002 | Park et al. |
| 6,421,009 B2 | 7/2002 | Suprunov |
| 6,438,376 B1 | 8/2002 | Elliott et al. |
| 6,438,381 B1 | 8/2002 | Alberth, Jr. et al. |
| 6,449,486 B1 | 9/2002 | Rao |
| 6,456,854 B1 | 9/2002 | Chern |
| D464,033 S | 10/2002 | Poirier |
| 6,466,788 B1 * | 10/2002 | Carlsson .................... 455/435.2 |
| 6,532,360 B1 | 3/2003 | Shaffer |
| 6,564,064 B1 * | 5/2003 | Ciganer et al. ............. 455/456.1 |
| 6,580,914 B1 | 6/2003 | Smith |
| 6,580,918 B1 | 6/2003 | Leickel |
| 6,583,716 B2 * | 6/2003 | Rangarajan ............. G06F 16/29 340/7.56 |
| 6,584,314 B1 | 6/2003 | Haumont |
| 6,587,691 B1 | 7/2003 | Granstam |
| 6,603,969 B1 | 8/2003 | Vuoristo |
| 6,603,977 B1 | 8/2003 | Walsh et al. |
| 6,610,687 B1 | 8/2003 | Clark |
| 6,618,593 B1 | 9/2003 | Drutman et al. |
| 6,618,671 B2 | 9/2003 | Dooley et al. |
| 6,622,020 B1 | 9/2003 | Seki |
| 6,628,938 B1 | 9/2003 | Rachabathuni et al. |
| 6,647,257 B2 * | 11/2003 | Owensby .................... 455/414.1 |
| 6,662,014 B1 | 12/2003 | Walsh et al. |
| 6,662,614 B1 * | 12/2003 | Lim ................................ 72/186 |
| 6,665,389 B1 | 12/2003 | Haste, III |
| 6,677,894 B2 | 1/2004 | Sheynblat |
| 6,714,791 B2 | 3/2004 | Friedman |
| 6,716,101 B1 * | 4/2004 | Meadows et al. .......... 455/456.1 |
| 6,725,032 B1 * | 4/2004 | Sheridan et al. ............. 455/419 |
| 6,735,564 B1 | 5/2004 | Puhakainen |
| 6,778,837 B2 | 8/2004 | Bade et al. |
| 6,779,094 B2 | 8/2004 | Selkirk et al. |
| 6,795,710 B1 | 9/2004 | Creemer |
| 6,798,358 B2 | 9/2004 | Joyce et al. |
| 6,806,813 B1 | 10/2004 | Cheng et al. |
| 6,816,735 B1 | 11/2004 | Rayburn et al. |
| 6,826,398 B1 | 11/2004 | Lagerstrom et al. |
| 6,836,667 B1 | 12/2004 | Smith |
| 6,870,822 B2 | 3/2005 | Balogh |
| 6,879,838 B2 | 4/2005 | Rankin et al. |
| 6,882,837 B2 | 4/2005 | Fernandez et al. |
| 6,882,856 B1 | 4/2005 | Alterman |
| 6,885,874 B2 * | 4/2005 | Grube et al. .................. 455/520 |
| 6,912,398 B1 | 6/2005 | Domnitz |
| 6,912,545 B1 | 6/2005 | Lundy et al. |
| 6,920,319 B2 | 7/2005 | Knutsson et al. |
| 6,928,279 B2 | 8/2005 | Seligmann et al. |
| 6,932,698 B2 | 8/2005 | Sprogis |
| 6,944,447 B2 | 9/2005 | Portman et al. |
| 6,968,179 B1 * | 11/2005 | De Vries .................... 455/414.1 |
| 6,975,998 B1 | 12/2005 | Jones |
| 6,983,313 B1 * | 1/2006 | Korkea-Aho ....... G06F 16/9537 709/219 |
| 6,999,777 B1 * | 2/2006 | Ganesh ...................... 455/456.1 |
| 7,010,110 B2 | 3/2006 | Jorasch et al. |
| 7,013,148 B1 | 3/2006 | Ganesh |
| 7,072,956 B2 | 7/2006 | Parupudi |
| 7,130,630 B1 * | 10/2006 | Enzmann et al. .......... 455/435.1 |
| 7,177,651 B1 * | 2/2007 | Almassy .................... 455/456.1 |
| 7,215,965 B2 | 5/2007 | Fournier et al. |
| 7,248,872 B2 * | 7/2007 | Bassett et al. ................ 455/433 |
| 7,269,426 B2 * | 9/2007 | Kokkonen et al. ......... 455/456.1 |
| 7,272,220 B1 | 9/2007 | Zhang |
| 7,324,823 B1 * | 1/2008 | Rosen et al. ................ 455/456.1 |
| 7,333,776 B1 | 2/2008 | York |
| 7,409,429 B2 | 8/2008 | Kaufman |
| 7,532,894 B1 * | 5/2009 | Muhonen ................ H04W 8/10 455/404.2 |
| 7,570,958 B2 | 8/2009 | Krasner |

(56) References Cited

U.S. PATENT DOCUMENTS

| | | | |
|---|---|---|---|
| 7,983,947 B2 | 7/2011 | Kaiwa | |
| 8,073,087 B2 * | 12/2011 | Casaccia | H04L 1/0045 375/347 |
| 8,478,304 B1 | 7/2013 | David et al. | |
| 9,446,118 B2 | 9/2016 | Bublot et al. | |
| 2001/0029184 A1 | 10/2001 | L'Anson et al. | |
| 2001/0048364 A1 | 12/2001 | Kaithoff et al. | |
| 2001/0055328 A1 * | 12/2001 | Dowling | 375/130 |
| 2002/0003470 A1 | 1/2002 | Auerbach | |
| 2002/0039904 A1 | 4/2002 | Anderson | |
| 2002/0042277 A1 | 4/2002 | Smith | |
| 2002/0061746 A1 * | 5/2002 | Jo | H04W 8/12 455/433 |
| 2002/0086683 A1 * | 7/2002 | Kohar et al. | 455/456 |
| 2002/0102989 A1 * | 8/2002 | Calvert et al. | 455/456 |
| 2002/0115453 A1 * | 8/2002 | Poulin et al. | 455/456 |
| 2002/0141434 A1 * | 10/2002 | Grundvig et al. | 370/442 |
| 2002/0164998 A1 | 11/2002 | Younis | |
| 2002/0177451 A1 * | 11/2002 | Ogasawara | H04W 64/00 455/456.1 |
| 2002/0183059 A1 | 12/2002 | Noreen et al. | |
| 2003/0004743 A1 | 1/2003 | Callegari | |
| 2003/0013456 A1 * | 1/2003 | Bates et al. | 455/456 |
| 2003/0013461 A1 | 1/2003 | Mizune et al. | |
| 2003/0023726 A1 | 1/2003 | Rice et al. | |
| 2003/0069692 A1 | 4/2003 | Krasner | |
| 2003/0119522 A1 * | 6/2003 | Barclay et al. | 455/456 |
| 2003/0154243 A1 * | 8/2003 | Crockett | H04L 63/08 709/203 |
| 2004/0033795 A1 * | 2/2004 | Walsh et al. | 455/404.1 |
| 2004/0038706 A1 | 2/2004 | Wasser et al. | |
| 2004/0054428 A1 | 3/2004 | Sheha | |
| 2004/0077359 A1 * | 4/2004 | Bernas et al. | 455/456.1 |
| 2004/0109435 A1 * | 6/2004 | Alasti | H04L 1/0006 370/350 |
| 2004/0127231 A1 | 7/2004 | Dor | |
| 2004/0180669 A1 | 9/2004 | Kall | |
| 2005/0097595 A1 * | 5/2005 | Lipsanen et al. | 725/25 |
| 2005/0222756 A1 | 10/2005 | Davis et al. | |
| 2008/0299355 A1 | 11/2008 | Rosen | |
| 2009/0005019 A1 | 1/2009 | Patel et al. | |
| 2009/0029717 A1 * | 1/2009 | Bates | H04W 4/02 455/456.1 |
| 2009/0197612 A1 * | 8/2009 | Kiiskinen | 455/456.1 |
| 2010/0151815 A1 * | 6/2010 | Zellner | H04W 4/02 455/404.2 |
| 2012/0106728 A1 | 5/2012 | Ghaffari et al. | |

FOREIGN PATENT DOCUMENTS

| | | |
|---|---|---|
| WO | WO 99/051051 | 3/1999 |
| WO | WO 00/028760 | 5/2000 |
| WO | WO 00/035228 | 6/2000 |
| WO | WO 00/038350 | 6/2000 |
| WO | WO 00/064075 | 10/2000 |
| WO | WO 00/076194 | 12/2000 |
| WO | WO 00/076243 | 12/2000 |
| WO | WO 01/001711 | 1/2001 |
| WO | WO 01/001718 | 1/2001 |
| WO | WO 01/003406 | 1/2001 |
| WO | WO 01/003454 | 1/2001 |
| WO | WO 01/003461 | 1/2001 |
| WO | WO 01/010718 | 1/2001 |
| WO | WO 01/020938 | 3/2001 |
| WO | WO 01/033885 | 5/2001 |
| WO | WO 01/039525 | 5/2001 |
| WO | WO 01/039528 | 5/2001 |
| WO | WO 01/041468 | 6/2001 |
| WO | WO 01/050544 | 7/2001 |
| WO | WO 01/086880 | 11/2001 |
| WO | WO 01/089251 | 11/2001 |
| WO | WO 02/003718 | 1/2002 |

OTHER PUBLICATIONS

Wrolstad, Jay, "Sprint Rolls Out E911 Services," newsfactor.com (as viewed at http://www.newsfactor.com/perl/story/15506.html on Jan. 22, 2007), Dec. 26, 2001).

"Sprint PCS First Quarterly E911 Implementation Report," Before the Federal Communications Commission, in the Matter of Revision of the Commission's Rules to Ensure Compatibility With Enhanced 911 Emergency Calling Systems , CC Docket No. 944-102, Feb. 1, 2002.

"Who is Integrated Data Communications?," presented at the FCC E-911 Automatic Location Identification Round Table, Jun. 28, 1999.

"Wireless Telecommunications Bureau Seeks Comment on Request to Commence Rulemaking to Establish Fair Location Information Practices," WT Docket No. 01-72, DA 01-696, (as viewed at http://www.fcc.gov.Bureaus/Wireless/PublicNotices/9001/da010696.html on Jan. 22, 2007), Mar. 16, 2001.

"Go2 Systems & Integrated Data Communications to Deliver Location Services Automatically to Wireless Phones; Alliance Enables Automatic Recognition of Wireless Caller's Location," Business Wire (as viewed at http://www.findarticles.com/p/articles/mi_m0EIN/is_2000_Feb_28/ai/59621222 on Jan. 22, 2007), Feb. 28, 2000.

"Before the Federal Communications Commission: In the Matter of: E-911 Automatic Location Identification Round Table," Transcript, Jun. 28, 1999.

"Pulver.com's Location Based Services Report," pulver.com (as visited at http://pulver.com/lbareport/lastlbareport.16jan01.txt on Jan. 22, 2007), Jan. 2001.

"Pulver.com's Location Based Services Report," pulver.com (as visited at http://pulver.com/lbareport/lastlbareport.26feb01.txt on Jan. 22, 2007), Feb. 2001.

"Pulver.com's Location Based Services Report," pulver.com (as visited at http://pulver.com/lbareport/lastlbareport.26mar01.txt on Jan. 22, 2007), Mar. 2001.

"Pulver.com's Location Based Services Report," pulver.com (as visited at http://pulver.com/lbareport/lastlbareport.05apr01.txt on Jan. 22, 2007), Apr. 2001.

"Pulver.com's Location Based Services Report," pulver.com (as visited at http://pulver.com/lbareport/lastlbareport.01may01.txt on Jan. 22, 2007), May 2001.

"Pulver.com's Location Based Services Report," pulver.com (as visited at http://pulver.com/lbareport/lastlbareport.10jun01.txt on Jan. 22, 2007), Jun. 2001.

"Pulver.com's Location Based Services Report," pulver.com (as visited at http://pulver.com/lbareport/lastlbareport.05jul01.txt on Jan. 22, 2007), Jul. 2001.

"Pulver.com's Location Based Services Report," pulver.com (as visited at http://pulver.com/lbareport/lastlbareport.01aug01.txt on Jan. 22, 2007), Aug. 2001.

"Pulver.com's Location Based Services Report," pulver.com (as visited at http://pulver.com/lbareport/lastlbareport.04sep01.txt on Jan. 22, 2007), Sep. 2001.

"Pulver.com's Location Based Services Report," pulver.com (as visited at http://pulver.com/lbareport/lastlbareport.02oct01.txt on Jan. 22, 2007), Oct. 2001.

"Pulver.com's Location Based Services Report," pulver.com (as visited at http://pulver.com/lbareport/lastlbareport.02nov01.txt on Jan. 22, 2007), Nov. 2001.

"Pulver.com's Location Based Services Report," pulver.com (as visited at http://pulver.com/lbareport/lastlbareport.03dec01.txt on Jan. 22, 2007), Dec. 2001.

"Pulver.com's Location Based Services Report," pulver.com (as visited at http://pulver.com/lbareport/lastlbareport.07jan02.txt on Jan. 22, 2007), Jan. 2002.

"Pulver.com's Location Based Services Report," pulver.com (as visited at http://pulver.com/lbareport/lastlbareport.04feb02.txt on Jan. 22, 2007), Feb. 2002.

"Pulver.com's Location Based Services Report," pulver.com (as visited at http://pulver.com/lbareport/lastlbareport.04mar02.txt on Jan. 22, 2007), Mar. 2002.

(56) References Cited

OTHER PUBLICATIONS

ETSI TS 101 513. "Digital Cellular Telecommunications System (Phase 2): Location Services (LCS)," GSM 12.71, version 8.0.1. 1999.

ETSI TS 101 527 "Digital Cellular Telecommunications System (Phase 2+): Location Services (LCS): Mobile Station (MS): Serving Mobile Location Centre (SMLC)," Radio Resource LCS Protocol (RRLP), GSM 04.31, version 8.1.0. 1999.

\* cited by examiner

Locating Susan Pracht . . .

Susan Pracht Has Not Given You
Locate Rights

Give/Modify Locate Rights To

Bill Marantz  
Brenden Epps  
Eric Nicklaus

Jef Leon  
Ken Gould  
Mike Gerome  
Susan Pracht

FIG. 9

ALERT

SUSAN PRACHT HAS JUST
ENTERED NEW YORK

SYSTEMS AND METHODS FOR LOCATING CELLULAR PHONES AND SECURITY MEASURES FOR THE SAME

CROSS-REFERENCE TO RELATED APPLICATIONS

This application is a continuation of U.S. patent application Ser. No. 10/400,296, filed on Mar. 25, 2003, which claims the benefit of U.S. Provisional Application No. 60/367,967, filed on Mar. 25, 2002, both of which are incorporated by reference herein in their entirety.

BACKGROUND OF THE INVENTION

This invention relates to systems and methods for determining a device's location. More particularly, this invention relates to systems and methods for remotely determining a device's location.

The Global Positioning System (GPS) has been developed in which a ground-based system can receive GPS signals from satellites and determine its location based on the time that it takes the GPS signals to reach the ground-based system. Generally, three satellite signals are needed to determine where in the world a receiver is located (i.e., position triangulation).

GPS systems have been integrated into cellular phones. However, these systems are deficient because the location of a device that is determined by these GPS signals are only minimally utilized. It is therefore desirable to provide systems and methods which better utilize the information about a device's location.

SUMMARY OF THE INVENTION

In accordance with the present invention, systems and methods are provided for locating cellular phones. More particularly, the present invention provides systems and methods for allowing a user of a cellular phone (e.g., a requesting user or a requester) to locate the position of a different user's cellular phone (e.g., a requested user) based upon requestor-assigned access rights.

One object of the present invention is to provide a security feature which allows a user to limit and/or deny location access to a particular user. In preferred embodiments, only the users that have been granted access to the location of a user's cellular phone can actually locate that user's cellular phone. Furthermore, different types of access levels may be provided that allow a user to filter location information to a different user. In this manner, a cell phone user may give access, through his or her cell phone, to a friend so that the friend can locate him or her dependent on the level of access that is granted to that friend.

For example, suppose that Phil tells Bill that he will be shopping in Manhattan and that Bill should locate him when Bill gets to Manhattan through their cell phones. In such an example, Phil may grant Bill access the exact location of his cell phone for a specific period of time (e.g., the next two hours). As a result, when Bill tries to access Phil's location, Bill will be told exactly where in Manhattan Phil's cell phone is located. Thus, Bill does not have to contact Phil directly to see where he is and, therefore, Phil does not have to spend any time giving Bill verbal directions; Bill can simply see what store Phil is currently in and go to it.

As mentioned previously, levels in the scope of access may be controlled by a user such that, for example, only a user's exact location, approximate location, city, state, or country can be accessed by a particular user.

Location alerts and monitoring features are also provided. For example, Phil may give Jen, a resident of Pittsburgh, city access so that when Phil travels into Pittsburgh, Jen will be alerted of Phil's presence. Such an alert may take the form of, for example, a display on Jen's cell phone that communicates to Jen "Phil is in Pittsburgh."

Locating a cellular phone may be accomplished in several ways. For example, satellite positioning systems such as the Global Positional System and the soon to be deployed Galileo system may be used to locate a user's cell phone.

User positions and security settings may be regularly or manually transmitted to a remote system, such a remote database so that requesting users can locate a requested user's position even if the requested user turns his/her cell phone OFF. Placing the security measures on a remote system (e.g., remote database, computer, or server) provides an information brokering scheme such that the system is still operable even when cell phones are added, removed, or modified from the system.

Additionally, the present invention may be configured to provide additional information about the location of a user. Such additional information may be, for example, a map, a location marker on a map, a map that changes as the user moves, a compass, coordinates of the located cell phone, directions to the located cell phone, where a user is in relation to another user, and information about the location the located user is currently positioned in or nearby locations such as landmarks. Such information may be provided by a remote information provider (e.g., a remote map information provider) and accessed by an information broker through a communications network.

Many other features are also employed that realizes advantageous locating functionality. As per an example, suppose that a wife wants to see if her husband has left work yet. She can locate her husband, without having to talk to him, and realize that he is driving home on a highway. Thus, a travel time option may be provided to the user. This option would compute the distance between the wife's location and husband's location by taking multiple location readings of the husband's location to see how fast the husband is traveling. Alternatively, because the husband's position will map to a highway, the system may assume that the user is driving and may provide the wife with an estimate on the husband's arrival time based on an assumed route. In this manner, the present invention may determine how much time it will take the husband to reach the wife and display this information to the wife.

As per other examples, a "see my friends" option may also be provided that brings up a map of a desired area. Dots or symbols may be present on the map to signify the location of all user's from which the requesting user has location information for. Similarly, a "find closest friend" option may be employed which finds the closest user with which the requesting user has location access to.

A cell phone location may by accessed by a variety of other devices. Alternatively, a cell phone may be used to access the location of a variety of other devices. For example, if the wife was at home, that wife may connect to the internet and access a remote database to either provide the most recent location information about the husband's cell phone to her or request a location update from the husband's cell phone. The wife's location may be already stored in such a database by associating the location to the IP address of the computer or by a manual input of the wife's location. The wife's identity may be determined by, for example, a login and password on a website. Thus, the above-identified security measures are not limited to device-to-device locating rather user to user locating; the wife may only access the husband's location if the husband has granted access for the wife to do so. If, by accident, the wife's cell phone breaks, she may login on a friend's cell phone and determine the husband's location according to the device that the husband is logged into.

Security is preferably taken into account in the present invention and, therefore, location rights for a specific user may be given to a different user only by that specific user. However, a user may request location access rights from a different user. For example, a user may be provided with a request location screen on his cell phone and that user (e.g., user "X") may enter in the cell phone number of the cell phone whose location is desired. The user associated to the entered cell phone number may then receive an alert that says "user X has requested access to your location." Location access may then be given or denied on multiple levels and the requesting user notified of the decision.

The location feature of the present invention may be turned ON or OFF at any time. Users may be added, individually or in groups, to a list of users with location access rights to a specific user by that specific user. A specific user may, at any time, modify, delete, or add users allowed to access his or her location. Login and password information may be included to increase security or to create a user profile, allowing a specific user to log into any cell phone and be recognize by the present invention (and thereby be located with that cell phone or locatable device).

BRIEF DESCRIPTION OF THE DRAWINGS

The principles and advantages of the present invention can be more clearly understood from the following detailed description considered in conjunction with the following drawings, in which the same reference numerals denote the same structural elements throughout, and in which:

FIG. 5 is a display screen for a retrieving location status feature in accordance with the principles of the present invention;

FIG. 8 is a display screen of a failed locate feature due to insufficient rights in accordance with the principles of the present invention;

FIG. 9 is a display screen of adding and modifying locate rights and options to a user in accordance with the principles of the present invention;

FIG. 12 is a display screen of an alert feature in accordance with the principles of the present invention;

DETAILED DESCRIPTION OF THE INVENTION

Figure 1:
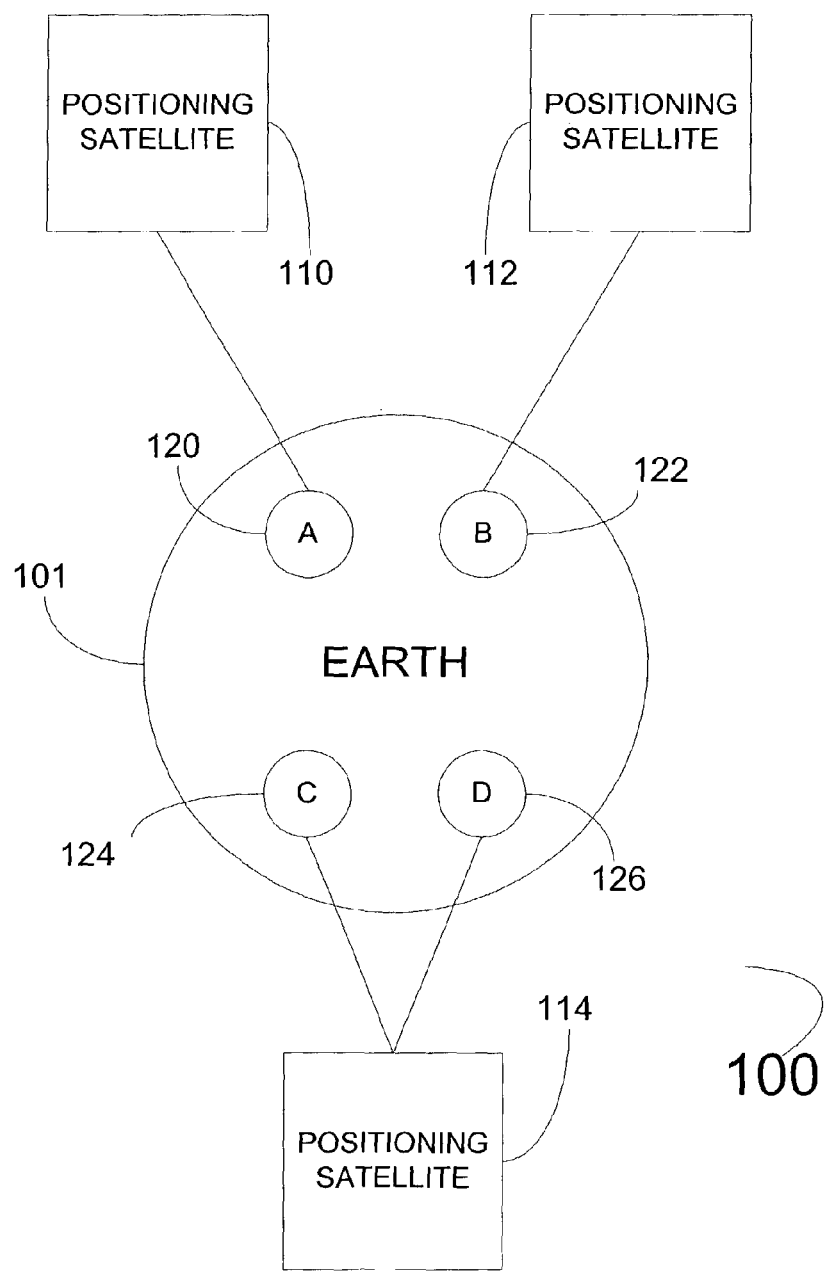
FIG. 1 is a network topology of a cell phone locating network in accordance with the principles of the present invention.

FIG. 1 depicts a network topology of device location network 100 incorporating principles of the present invention. Network 100 includes one or more positioning satellites 110, 112, and 114 that can locate the position of one or more cell phones 120, 122, 126, and 124 (and other locatable devices) on Earth 101. Positioning satellites 110, 112, and 114 may be, for example, the Global Positioning System (GPS) or the upcoming Galileo satellite network.

Preferably, any cell phone in network 100 may locate a different cell phone, as long as access to location information is allowed, through the utilization of positioning satellites 110, 112, and 114. Persons skilled in the art will appreciate that other positioning systems and methods may be used in locating the position of a user on a cell phone of network 100.

To route information to and from a cell phone of network 100 additional facilities and communication paths may be included. For example, a main facility (not shown in FIG. 1) containing user location access rights may be included in network 100. Such a main facility may retrieve location information directly from a positioning system or a cellular phone and then route this information to a cellular phone or positioning system.

Persons skilled in the art will appreciate that if the Global Positioning System (GPS) is used as the positioning system then GPS receivers will be incorporated into cellular phones of the present invention. Persons skilled in the art will also appreciate that devices other than cellular phones may include positioning features. For example, watches, clothing, laptop computers, personal digital assistants (PDAs), may all contain location systems (e.g., GPS) and utilize the security principles of the present invention to allow different user's to access these locations.

Figure 2:
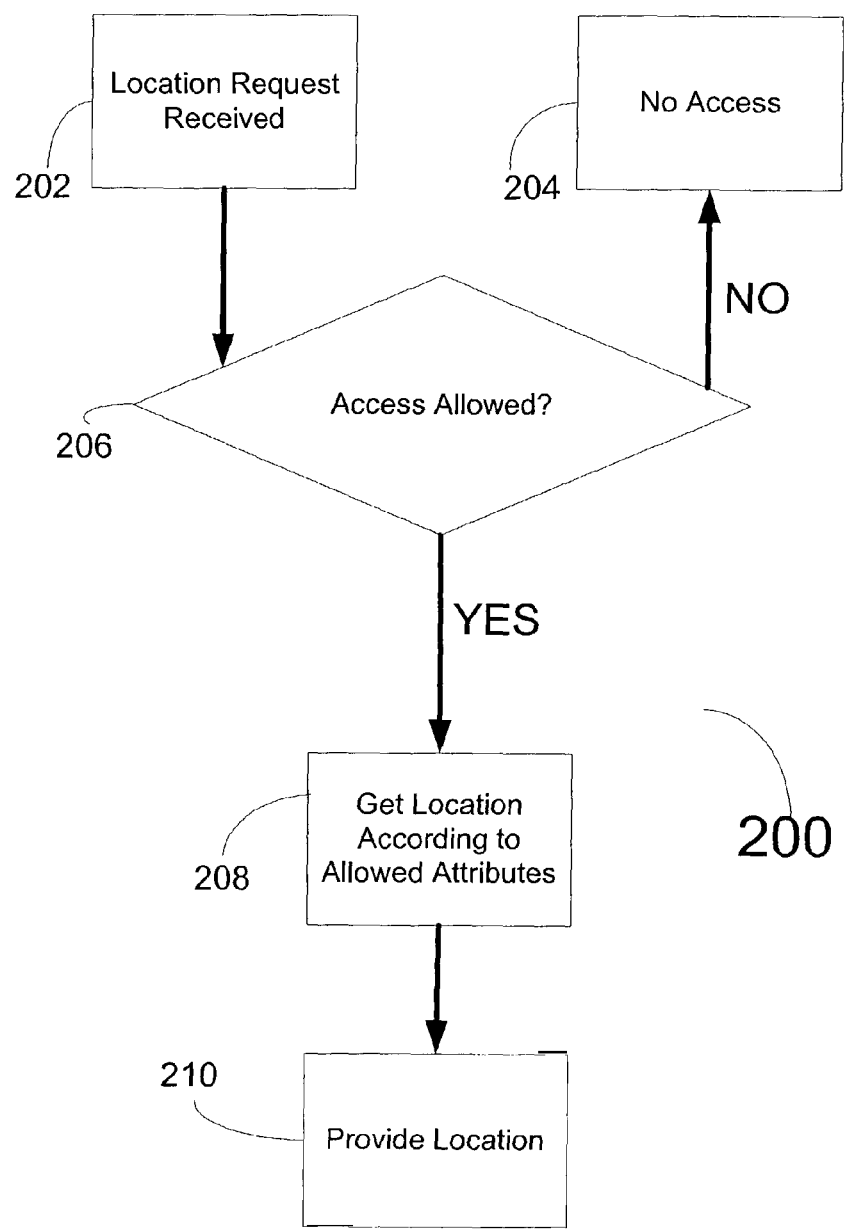
FIG. 2 is a flow chart of the locating feature in accordance with the principles of the present invention.

FIG. 2 shows flow chart 200 of a simplified locating feature constructed in accordance with the principles of the present invention. Step 202 initiates when a user requests the location of another user's cell phone. Step 206 evaluates if the user initiating the location request has the rights to access the location of the desired user. If no access rights for the requesting user have been granted then step 204 will preferably inform the requesting user that he/she has not been given access to the requested location. In this manner, every user may assign rights (e.g. govern the security) to whom may or may not locate him/her. In preferred embodiments, these rights will be stored in, or functionality executed from, a remote facility and accessed and utilized by a user's cell phone or other requesting device (e.g., a watch or PDA).

If access has been given by a particular user that allows for the requesting user to locate that particular user, step 208 is initiated and the allowed location information is provided to the user in step 210. Step 208 may optionally filter the location information such that only a portion information is passed to the requesting user. The requested user may have, for example, defined that the requesting user only can obtain the city, state, or country of his/her location. Persons skilled in the art will appreciate that only the location of the desired user needs to have a cell phone or a positioning system. The requesting user may user other means (e.g., the internet) to request the location of the desired user.

Persons skilled in the art will appreciate that the location of a user's cell phone may be retrieved, in step 208, from a remote database, facility, distribution center, or any other system. More particularly, a remote database may periodically request the location of a cell phone user with a positioning system and store this information. This database may also keep a record of those people allowed to access that user's location, the extent to which access is allowed, and the extent to which a user has requested a user's location. A user may update, add, manipulate, or remove access at any time by doing so at this database. Thus, a requesting user only has to contact the remote database, have his/her identity recognized, have his/her access rights for the requested user location determined, and, if the requesting user has the correct access rights, be provided with the requested user's location.

Instead of a remote database periodically obtaining location information for a user, the database can obtain a user's locations when a request is made for that user's location, providing the requesting user has access to the requested user's location. However, persons skilled in the art will recognize that a remote database is utilized in the above examples that contains the locations, in most circumstances, of a multitude of users. Thus, to increase security even more, a requesting user's cell phone may directly request a user's location from the requested user's cell phone without the need for a database. In such an example a user adds, manipulates, or removes access rights locally on his/her cell phone and does not have to worry about security issues that surround placing his location on a remote database. Furthermore, in such an embodiment a user's location does not have to be saved anywhere, a positioning system can just be "read" by a requesting user with the appropriate access rights.

However, by recording a user's location on a device, e.g., a cell phone's memory or in a remote database, novel applications may be utilized. For example, whenever a user makes a credit card purchase, a credit card authorization system can record the location of a cell phone associated to the purchasing user. In this manner, a new system and method of fraud protection is introduced. The credit card authorization system may, for example, reject a purchase if the purchaser's cell phone (or watch, clothing, PDA, or other positioning enabled device) is not in the vicinity of the purchase. Alternatively, the credit card authorization system may request a second form of identification if the purchaser's cell phone location does not correlate to the location of the purchase. Additionally, the credit card authorization system may call the purchaser's cell phone and request authorization for the credit card purchase. However, such features would preferably first involve the user/purchaser giving the credit card authorization system access to the location of his/her cell phone.

As per another application, a unique dating/matching service could be embodied. For example, a user may store a number of preferences in a matching profile. These preferences may describe what type of person he is interested in meeting. Additionally, a user may store, preferably locally (for the dating/matching feature) but alternatively at a remote location, his/her own profile that has data describing similar attributes for what he/she is looking for. For example, an entry in a user's profile may be "male" and an entry in "looking for" profile may be "female." When a user comes within a certain distance of a user (determined by comparing locations of a user) that fits his/her "looking for" profile, the user may be alerted of the proximity of a matching user. Preferably, the particular user is only alerted if the "looking for" user has entered in attributes similar to the particular user's attributes and is also alerted of the particular user. The next stages of such an application could include, for example, requesting access to a form of communication. Such a form of communication could be for example, talking on the phone, instant messaging, or delivering an email address. Persons skilled in the art will therefore appreciate that many useful applications may be constructed using the principles of the present invention.

Figure 3:
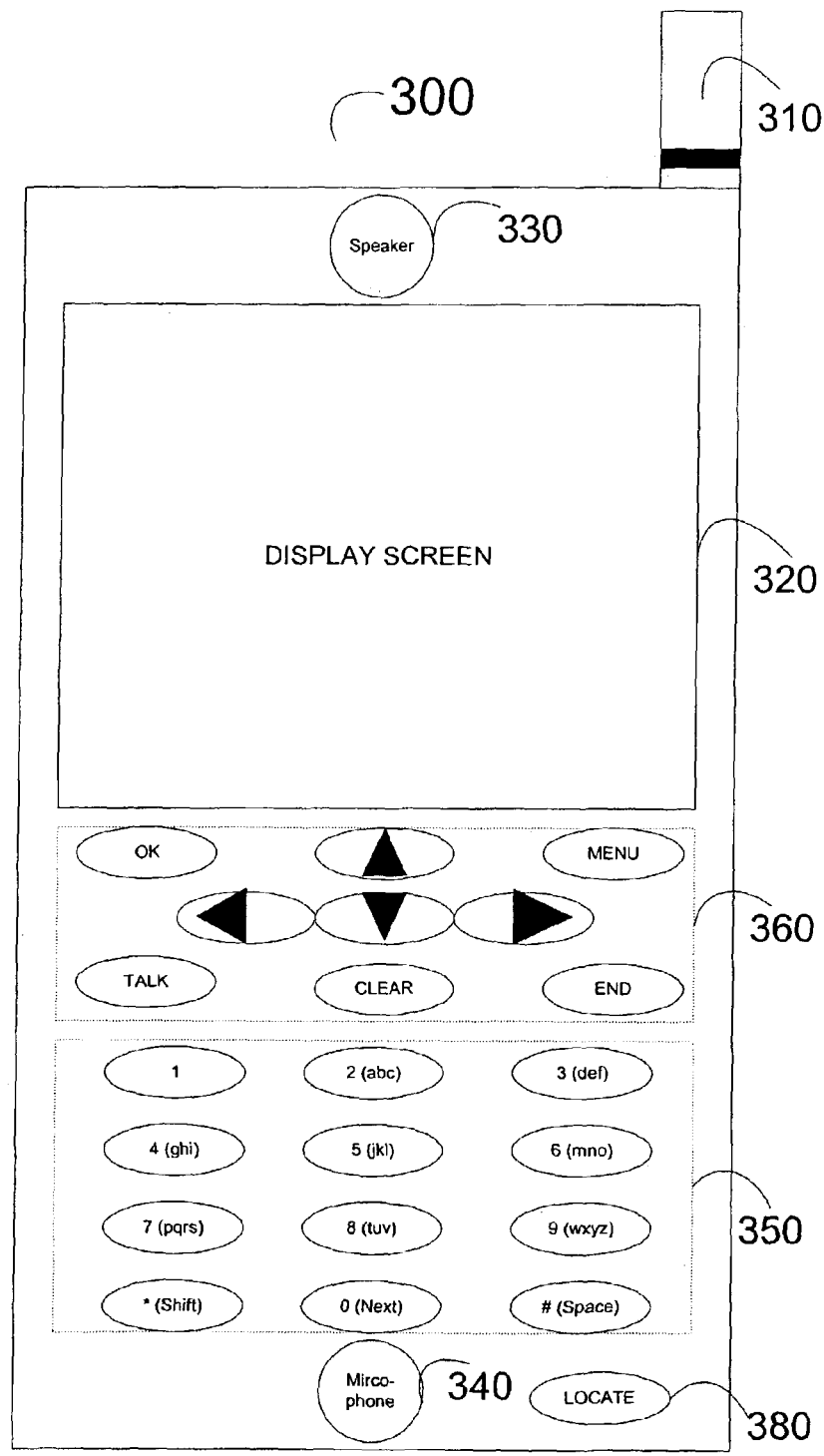
FIG. 3 is an illustration of a cell phone in accordance with the principles of the present invention.

FIG. 3 depicts cell phone 300 constructed in accordance with the principles of the present invention. Cell Phone 300 preferably includes speaker 330, antenna 310, display screen 320, control keys 360, alpha-numeric keys 350, and microphone 340. Cell phone 300 also preferably may include, for example, a communications transmitter (not shown), communications receiver (not shown), memory (not shown), positioning device (not shown), and a microprocessor (not shown).

Figure 4:
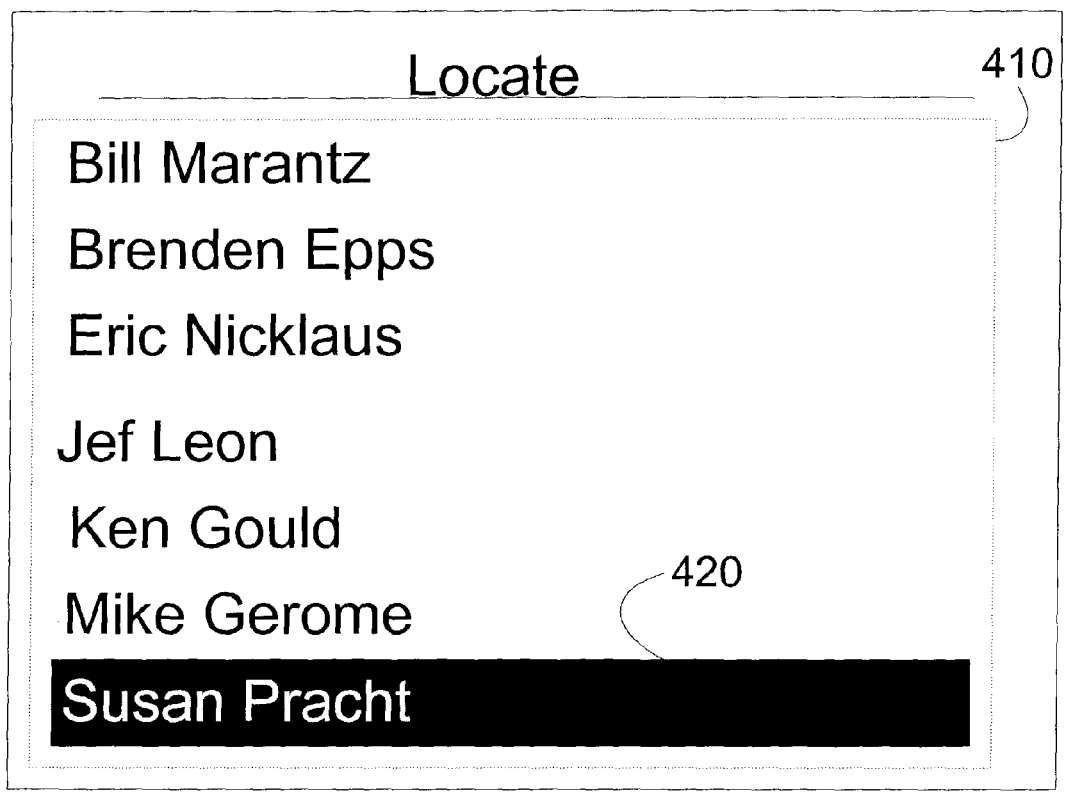
FIG. 4 is a display screen for a locate feature in accordance with the principles of the present invention.

Cell phone 300 may also include locate button 380. Cell phone 300 may be configured such that if locate button 380 is pressed, a locate feature is initiated (e.g., display screen 400 of FIG. 4 is initiated). Alternatively, cell phone 300 may be configured such that if locate button 380 is pressed, a location signal is sent to a remote storage area (e.g., a remote database), thus manually updating the user's location. This latter functionality may be useful when a user does not want his/her location accessed. As in another alternative embodiment, cell phone 380 may be configured such that if locate button 380 is pressed, the locating features of cell phone 300 are toggled between ON and OFF. Person skilled in the art will appreciate that locate button 380 may be configured to produce a variety of useful functionalities.

FIG. 4 depicts display screen 400 that is displaying a locate feature constructed in accordance with the principles of the present invention. The locate feature of display screen 400 may be included, for example, in cell phone 300 of FIG. 3 and displayed to the user of cell phone 300 of FIG. 3 when that user requests the location of a different user of the present invention. The programming for the feature may, for example, be stored in the memory of the cell phone and executed by the processor at a user's request. Locate Feature 400 includes identifier list 410 of alpha-numeric identifiers for users stored in the memory on cell phone 300 (FIG. 3) or at a remote location. More particularly the user of display 410 may locate a user contained in identifier list 410 by selecting an appropriate user identifier 420.

The user identifiers (e.g., "Susan Pracht") in identifier list 410 are selectable and may be selected by control keys 360 of FIG. 3. Highlight window 410 may be used to prompt the user what identifier from list 410 is currently selected any may be controlled, for example, by the input keys of the cell phone (e.g., keys 350 and 360 of FIG. 3). Identifiers may be associated to, for example, cellular telephone number, user profiles, or any other identifier that may be associated to a locatable device or user interacting with a locatable device.

Persons skilled in the art will appreciate that display screen 400 may be provided to a user of devices other than wireless devices. For example, display screen 410 may be provided to a user of a personal computer with no positioning system. Preferably, however, the security measures in accordance with the principles of the present invention are still abided to (e.g., access has been granted to the identifier associated to the requesting user). In this manner, a user can control who can access his/her wireless device (e.g., cell phone).

Persons skilled in the art will appreciate that identifier list 410 may be configured, for example, to contain only those users in which the user of cell phone 300 (FIG. 3) has locate access rights to or any user stored in cell phone 300. Persons skilled in the art will also appreciate that devices other than cell phone 300 may be used to incorporate the features of the present invention. Such devices could include, for example, personal digital assistants (PDAs), laptop, GPS pagers, GPS watches, car positioning devices, or any other devices that can be located. One advantage of the present invention is that it allows a mobile device with a positioning system to locate a different mobile device with a positioning system while still retaining a high level of location security and privacy.

Figure 5:
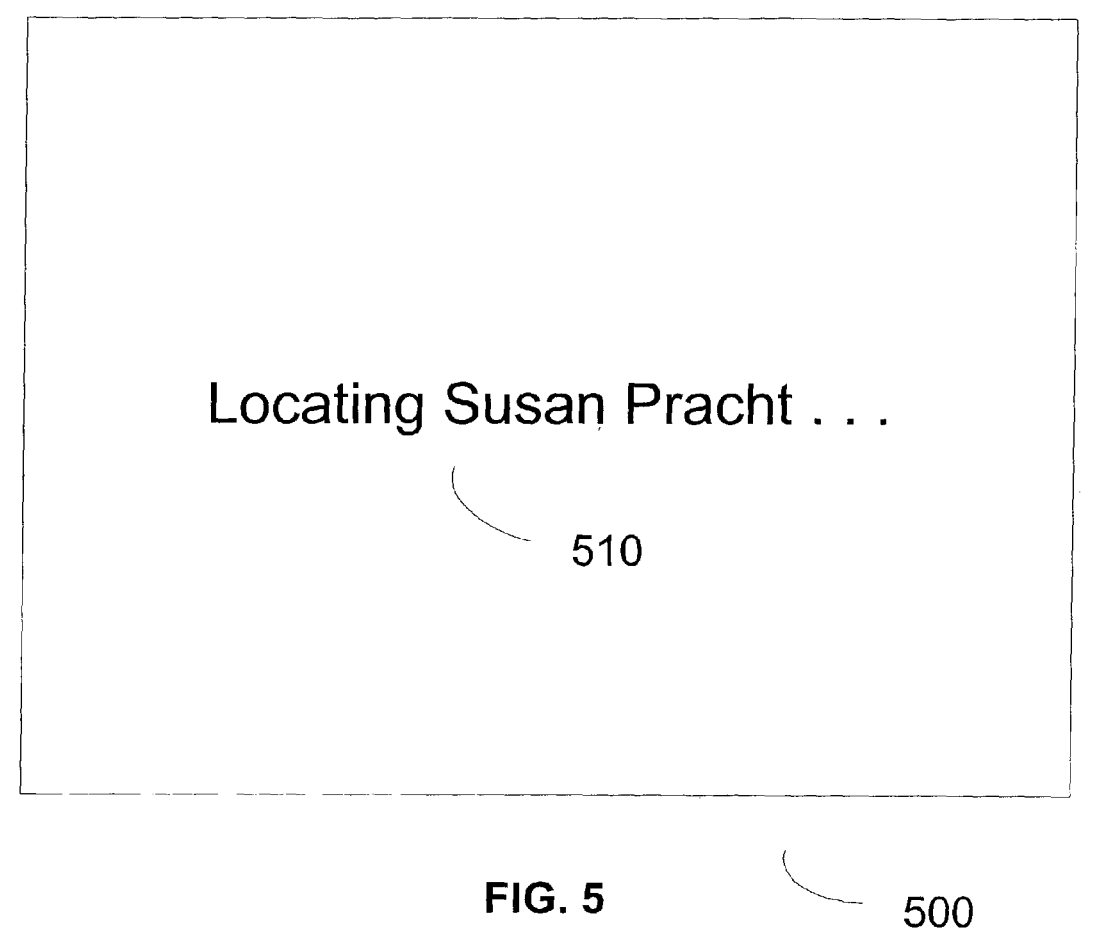

FIG. 5 is display screen 500 for retrieving location status feature in accordance with the principles of the present invention. The selected identifier may be incorporated into display screen 500 through location status display 510 to inform the user of the status of the location retrieval. For example, display screen 500 may display "locating user" while a request is being processed by a remote facility or database.

Figure 6:
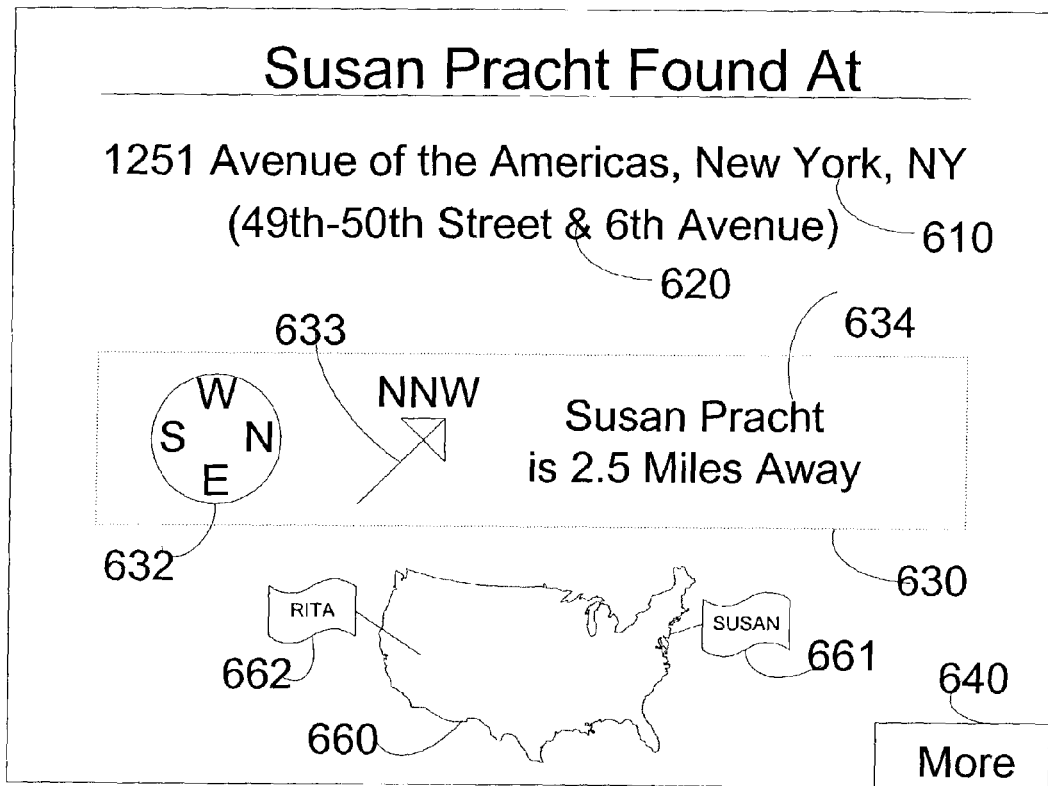
FIG. 6 is a display screen for a displaying location feature in accordance with the principles of the present invention.

FIG. 6 shoes display screen 600 for a display location feature constructed in accordance with the principles of the present invention. When a location is retrieved for the requested user, the location may be displayed on Display Screen 600 through primary location information 610. Depending on what scope the requesting user has access to primary location information 610 may include, for example, the country, state, city, exact location, or any combination thereof of location information to the user. For example, if the user requesting the location of a desired user has been given unlimited location access by the desired user, primary information 610 may include the exact location of the user.

Secondary location information 620 may be included to supplement the requested users exact location so that the requesting user may have more of an idea of where the requested user is located. For example, if the desired user is located in a mall, primary location information 610 may be the address of the mall. In such an example, secondary location information 620 may be included and display, to the requesting user, the name of the mall.

Directional information 630 may also be included on display 600 or any other display of the present invention. Directional information 630 may include a digital compass 632 so that the user of cell phone 300 (FIG. 3) knows what direction he or she is facing in. Digital compass 632 may be connected to a direction sensitive device (e.g, mechanical compass) in order to gather directional information. Directional arrow 633 may also be included in Display 600 to indicate where the requested user's location is relative to the location and direction of cell phone 300 (FIG. 3) (e.g, the requesting user). Persons skilled in the art will appreciate that for some directional information 630 the location of the requesting user must be obtained. This information may be obtained either from cell phone 300, a remote facility, or by any other suitable means. If the information is gathered from a location gathering device other than the requesting user's device (e.g, cell phone 300 (FIG. 3)), then the user's device may communicate from this other location gathering device. Once both the locations of the requesting and requested/desired users are known, this information may be utilized in a number of features incorporating the principles of the present invention.

Distance information 634 is one such feature that displays the distance between the locations of the requested and requesting users (e.g., distance between the locations of the requested and requesting devices). Directional information 630 may contain many other elements to enhance the utility of the present invention. For example, a map (not shown in FIG. 6) may be included in display 600. This map may be of the area surrounding either the requested, the requesting user's location or both. Information may be included on the map to show the shortest path between the location as well as information about the surrounding area (e.g, area names, store names, etc.). Other information may include, for example, time to reach the destination according to specific types of travel (e.g, subway, walking, running, driving) and the direction the requested user is traveling in.

Many uses for this information may be utilized by a user. For example, if Jane calls Bill and Bill says "I am roaming midtown Manhattan shopping why don't you join me", no other call to Bill is needed. Bill simply has to give Jane access to his location and Bill can continue shopping without having to worry about meeting up with Jane at a specific location.

In some instances, it may be beneficial to find the speed and direction of a requested user. For example, if a wife wants to see how long before her husband arrives home, the wife can use this feature of the present invention. This feature may find the husbands location multiple times in a determined amount of time. Through this information the feature may determine the speed and direction that the user is traveling. Using this speed, for example, this feature may display to the wife that the husband "is 10 minutes away" in directional information 630. In doing so, the need for a call to the husband to determine his location is eliminated.

Persons skilled in the art that the location of multiple users may be displayed on display screen 600. For example, suppose Jeff, Susan, and Chrissy are at a concert. If all three of these users have unlimited access to the other users, principles of the present invention would allow for a map to be displayed on each of the three locating devices with locator designations for each of the users. Using such map, the group may be able to find themselves in relative location to one another and decide, if need be, on the easiest location for them to meet. Thus map 660 may be included on display screen 600 and display the locations of multiple users (e.g., user's 621 and 622).

More region 640 designates that more options or information may be retrieved or performed using principles of the present invention. A user may use control keys 340 (FIG. 3) on cell phone 300 (FIG. 3) to perform the functionality associated with more region 640.

Figure 7:
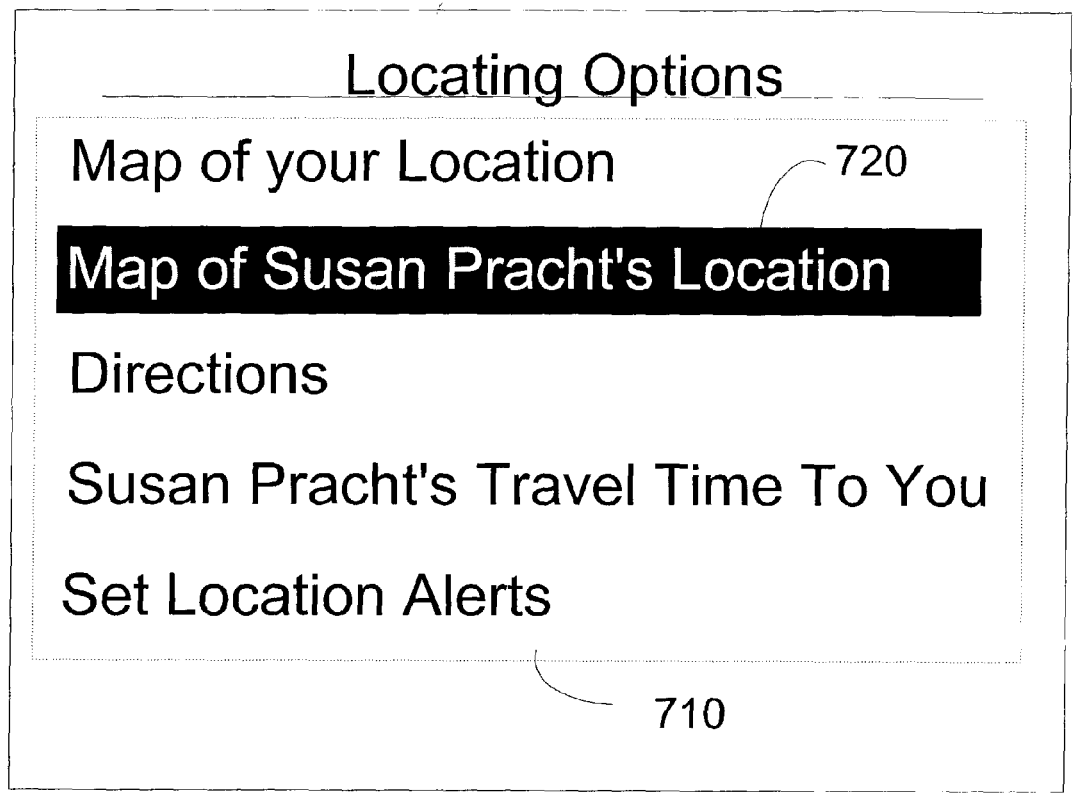
FIG. 7 is a display screen listing options for a locate feature in accordance with the principles of the present invention.

FIG. 7 shows display screen 700 for locate listing options in accordance with the principles of the present invention. Display screen 700 includes selectable options list 710 and highlight window 720 and may be displayed to the user, for example, through the activation of functionality associated by more region 640 (FIG. 6). Options list 710 may include any of the features of the present invention. For example, options list 710 may include options activating a display screen of a map of the requesting user's location, a map of the requested user's location, directions to the requested user's location from the requesting user's location, travel time for the requesting user, travel time for the requested user, and options to set location alerts.

FIG. 8 shows display screen 800 of a failed locate feature due to insufficient rights in accordance with the principles of the present invention. Display scree 800 may be displayed if a requesting user attempts to located a requested user but has not been given access rights by the request user to his or her location. In such an instance insufficient rights message 801 may be prompted on display screen 800.

FIG. 9 shows display screen 900 of adding and modifying locate rights and options to a user in accordance with the principles of the present invention. A user may give or modify access rights through display 900 to a user identifier in selectable user identifier listing 910. Highlight window 920 may be included to enhance the selecting process.

Figure 10:
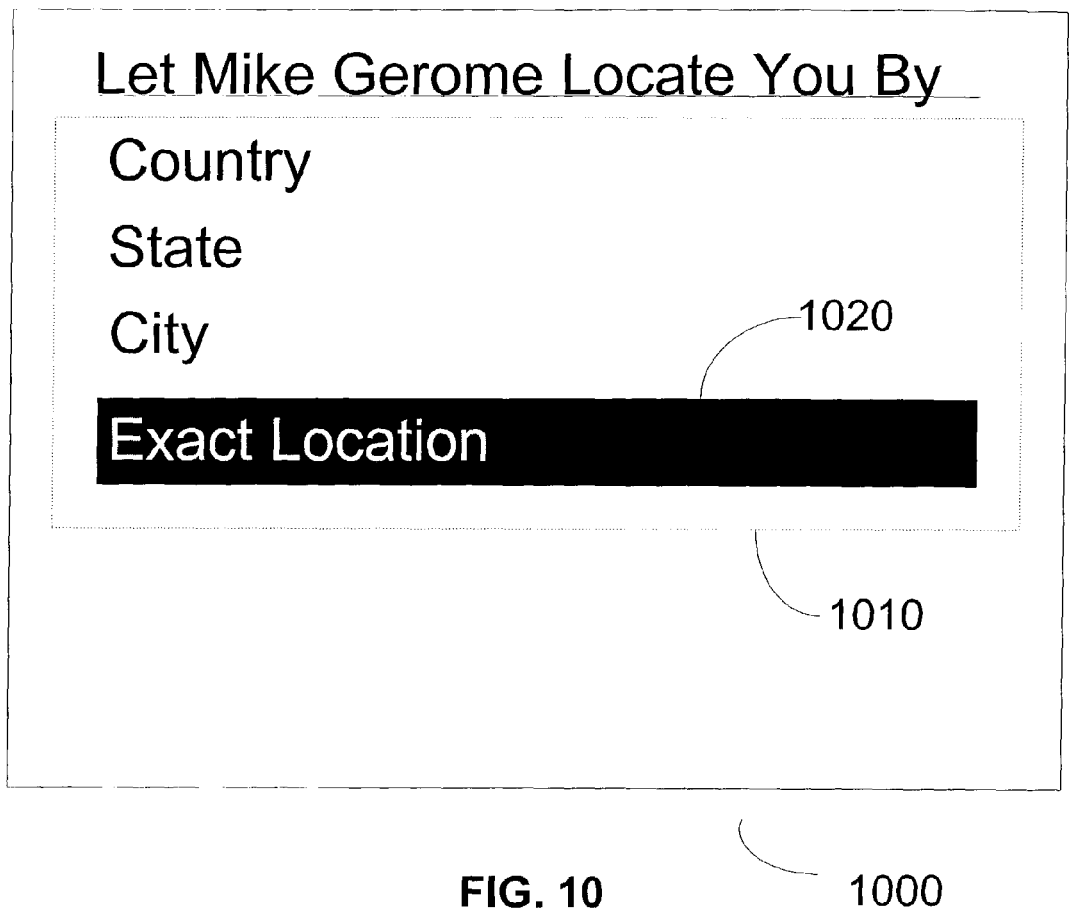
FIG. 10 is a display screen of assigning location rights to a user in accordance with the principles of the present invention.

FIG. 10 shows display screen 1000 of assigning location rights to a user in accordance with the principles of the present invention. Display screen 1000 may be displayed, for example, after a user has been selected to be given location rights. Display screen 1000 contains selectable location rights listing 1010, in which the selecting process may be enhanced by highlight window 1020. Possible location access rights may be, for example, by country, state, city, exact location, or any other scope of location. Other rights may be assigned such as particular times in the day or time periods at which locations may be accessed.

Figure 11:
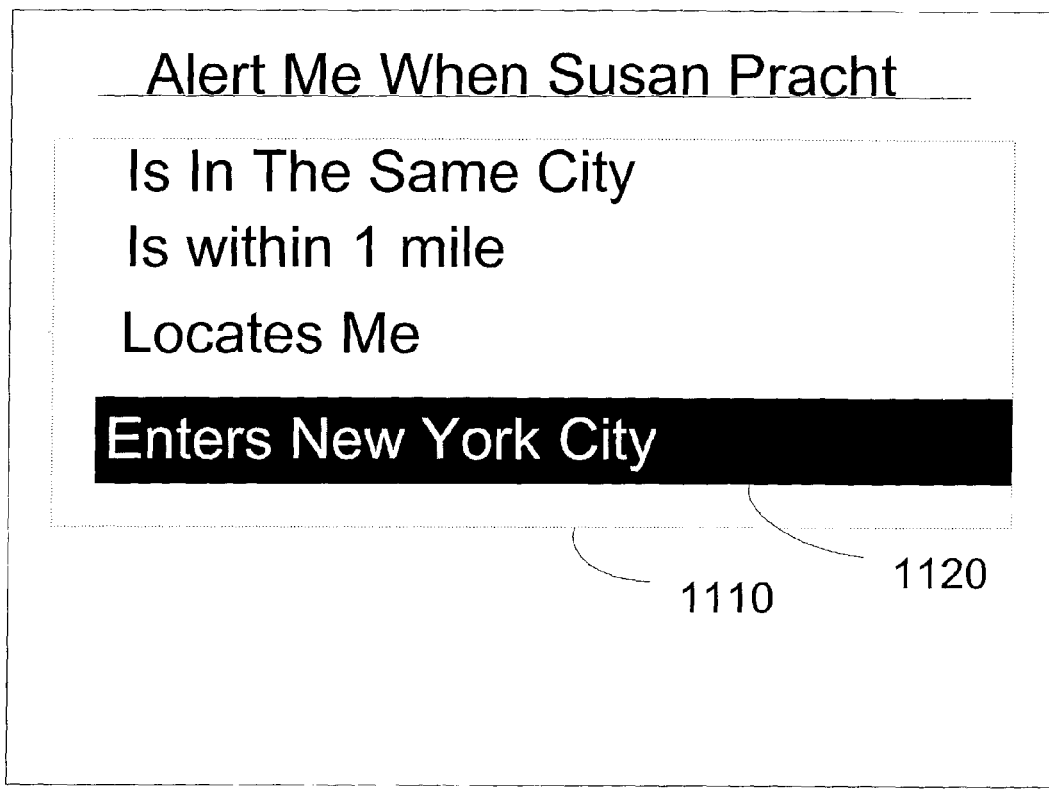
FIG. 11 is a display screen of alert options in accordance with the principles of the present invention.

FIG. 11 shows display screen 1100 of alert options in accordance with the principles of the present invention. Display screen 1100 allows for a user to set up alerts depending on the location of specific users. Selectable alert listings 1110 are included and may be selectable with highlight window 1120. Examples of alerts that may be included in display screen 1100 may occur, for example, if the requested user is in a specific city or the same city as the user of display 1100, is within a certain distance, or if a user located the user of display 1100.

The alerts of the present invention may realize useful functionality. For example, suppose Susan Pracht lives in Pittsburgh and rarely comes to the city of the user of display screen 1100 on cell phone 300 (FIG. 3) which is New York City. The user of cell phone 300 (FIG. 3) may then use display screen 1100 and set an alert such that if Susan Pracht ever enters New York City, he or she would be alerted of Susan Pracht's presence.

FIG. 12 shows display screen 1200 of an alert feature in accordance with the principles of the present invention. Display screen 1200 includes an alert message and is displayed to a user when an event occurs that is designated by the user in display screen 1100 (FIG. 11). Continuing the example from FIG. 11, if Susan Pracht enters New York City, alert message 1210 would prompt the user that this event has occurred.

Figure 13:
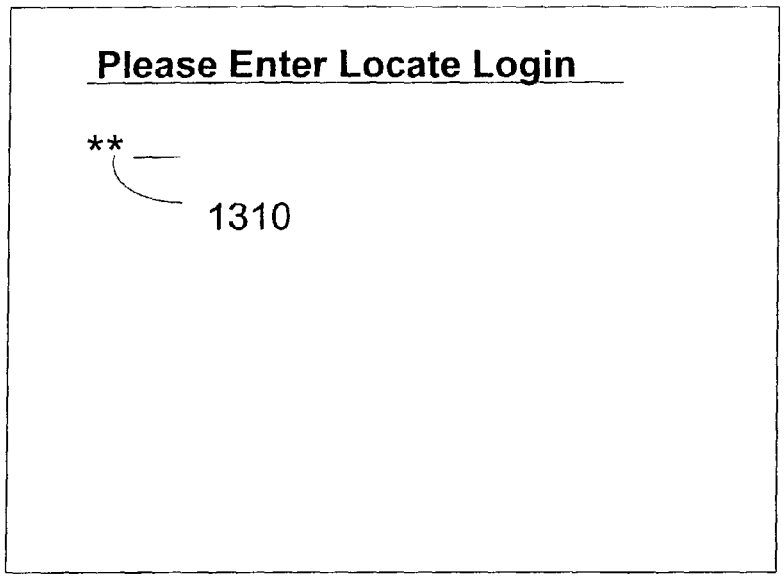
FIG. 13 is a display screen of a login feature in accordance with the principles of the present invention.

FIG. 13 shows display screen 1300 of a login feature in accordance with the principles of the present invention. In order for users to be identified by other user's cell phones or locating devices a user profile may need to be stored remotely from such devices. In such instances user profiles would be used as the locating identifier and the devices into which these profiles are logged into (recognized by) would allow for the user to be located. Display screen 1300 allows for a user to log into a locating device of the present invention. Logging into a device also adds a level of security to the present invention, especially when combined with a password. A user may use the controls of the device of the present invention to enter login 1310 of display 1300.

In this manner a user may use another user's location device (e.g., cell phone) to locate a user or may use, for example, the internet to locate a user. Additionally, in this manner, a user may change the device being located. For example, a user may use his or her car GPS system or other systems in accordance with the principles of the present invention to be located instead of his or her cell phone. To further this example, a user may log into a web site on the internet and designate his or her current location as home, or any other location, thus eliminating the need for locatable device entirely.

Figure 14:
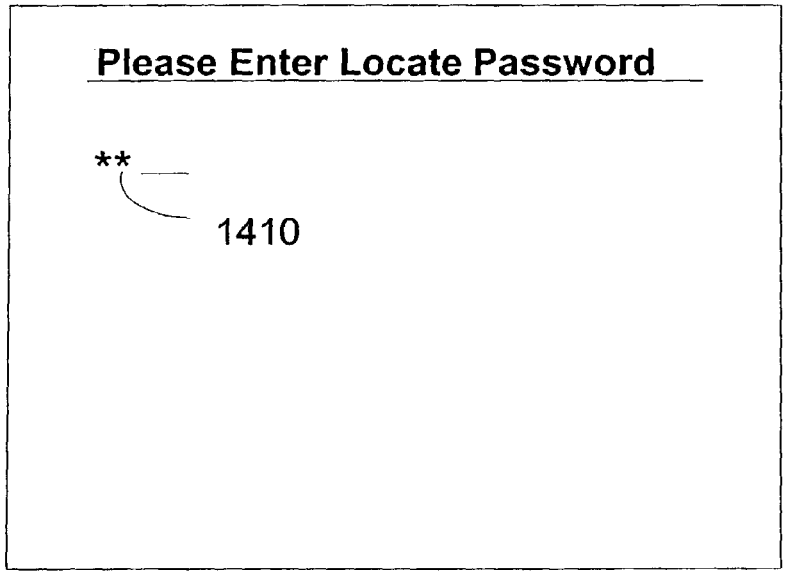
FIG. 14 is a display screen of a login feature in accordance with the principles of the present invention.

FIG. 14 shows display screen 1400 of a login feature in accordance with the principles of the present invention. Display screen 1400 may be used by a user to enter a password associated to his profile, identity, or cell phone functionality access. A user may enter password 1410 using the controls of the device of display screen 1400 (e.g., cell phone 300 of FIG. 3). By including a login/password scheme a user can be identified by a remote facility (e.g., a remote database) so that the user's location can be recorded/updated by multiple devices. Additionally, a login/password adds an extra level of security.

Figure 15:
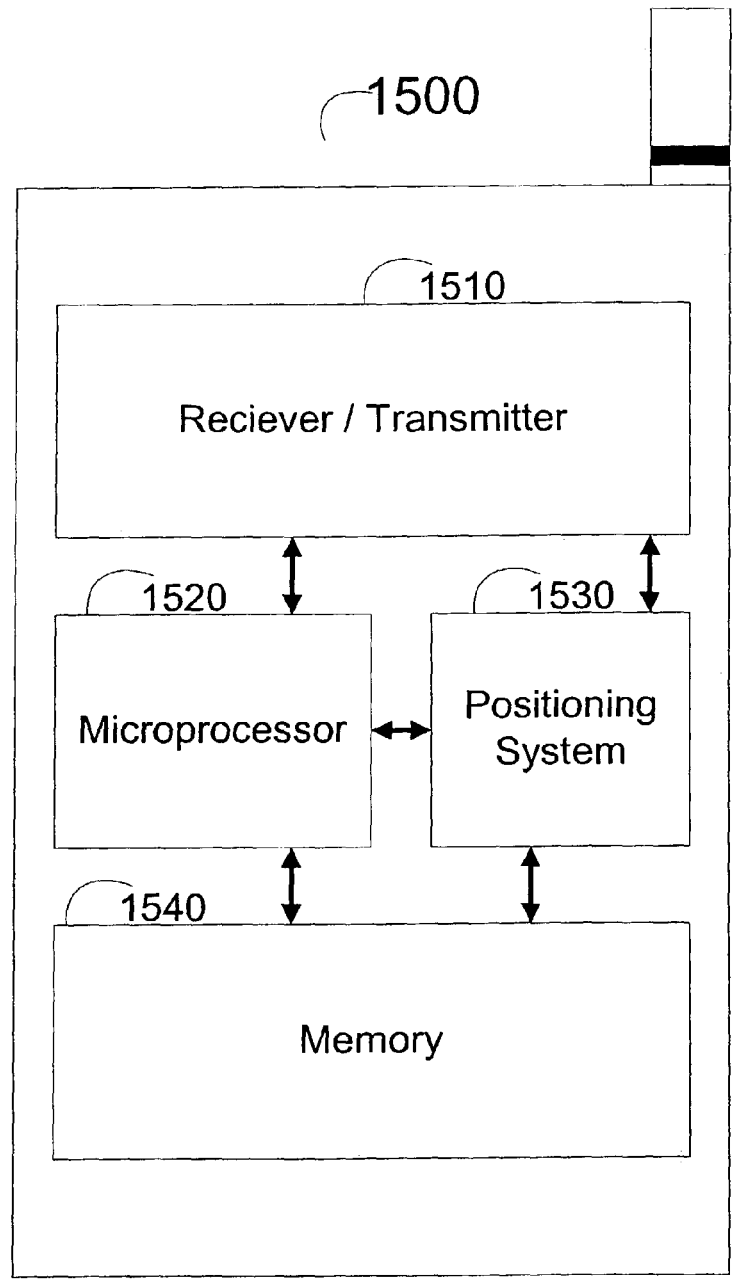
FIG. 15 is a wireless device in accordance with the principles of the present invention.

FIG. 15 shows cell phone 1500 that may be utilized to carry out the functionality in accordance with the principles of the present invention. Cell phone 1500 includes receiver/transmitter 1510, microprocessor 1520, positioning system 1530, and memory 1540.

Persons skilled in the art will appreciate that receiver/transmitter 1510 may directly communicate with memory 1540 if receiver/transmitter 1510 does not have its own memory (e.g., if receiver/transmitter 1510 are configured to utilize a buffer for capturing incoming communications bursts before demodulation and decryptions).

Positioning system 1530 may be, for example, a GPS system or a similar positioning system. Positioning system 1530 may include its own receiver for receiving particular signals utilized in positioning cell phone 1500.

Figure 16:
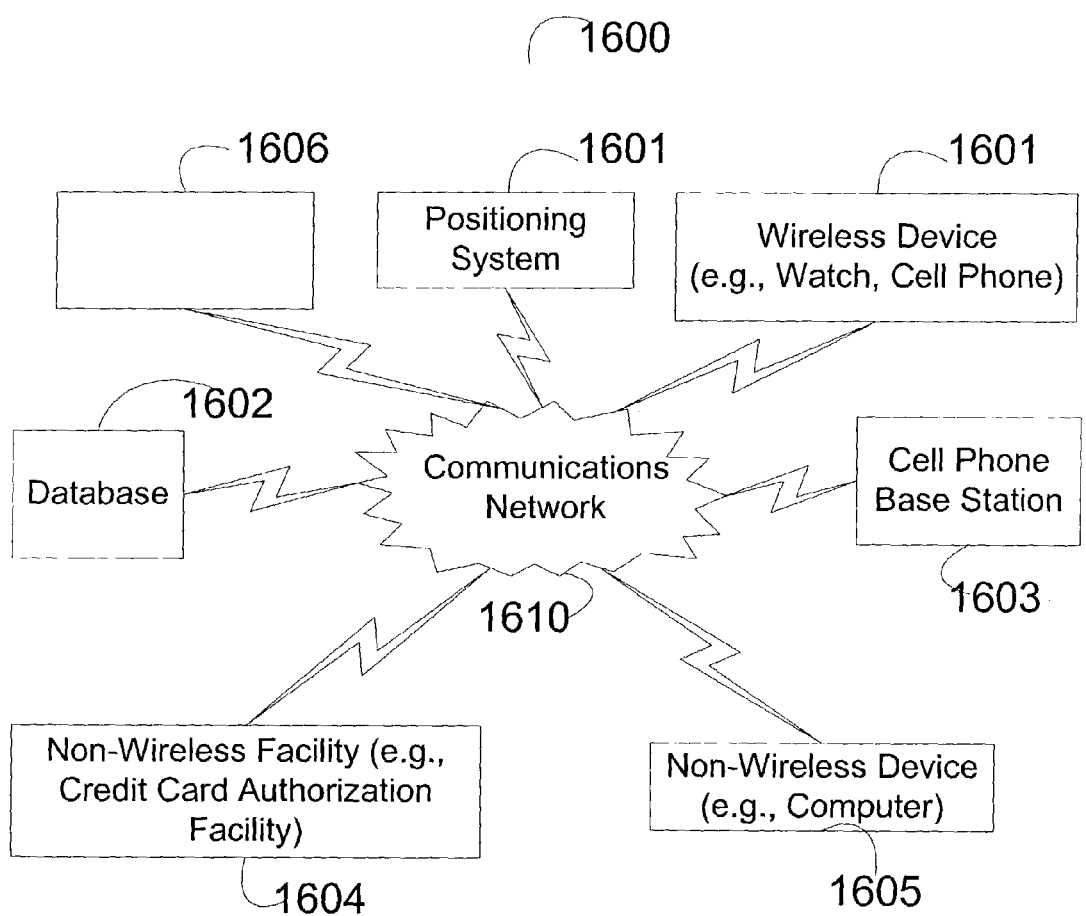
FIG. 16 is an embodiment of a network topology in accordance with the principles of the present invention.

FIG. 16 shows network topology 1600, in which all components of, or a part of the components of, may be utilized to carry out the features in accordance with the principles of the present invention. In this manner, persons skilled in the art will appreciate that multiple system configurations may be utilized. Topology 1600 introduces the diversity of systems that can be utilized to realize such configurations.

Generally, topology 1600 includes multiple mobile devices (e.g., multiple instances of mobile device 1601), access control devices and location broker devices (e.g., database 1602 and cell phone base station 1603), and non-mobile devices (e.g., grounded non-wireless device 1605). Persons skilled in the art will appreciate that other devices or facilities may be included in topology 1600. For example, one or more positioning systems 1601 may be included in topology 1600 in order to locate particular devices. For example, a positioning receiver (e.g., GPS receiver) may be included in wireless device 1601 with positing system 1601 being a positioning transmitter (e.g., GPS satellite network).

One or more wireless devices 1601 may be included in topology 1600 and may be, for example, watches, PDAs, cellular phones, radios, cars, or any other mobile device whose location can be determined.

As previously mentioned, access control and location broker devices may be included in topology 1600. Such devices may be utilized, for example, to store user access rights for a particular user and may contain functionality to request and route a device's location. These devices may be considered information broker's such that devices may be added, removed, or modified without creating the necessity of having to modify the other devices of topology 1600.

Database 1602 is one such information broker. Database 1602 may, for example, be located in cell phone base station 1603 if database 1602 is utilized to assist in cell phone locating. Database 1602 may be utilized, for example, to store a history a of a device's locations, a user's list of assigned access rights to other users, a log of a user's call activity, a log of a location initiations, a user profile, login/password information, or any other sort of information. Many features may be provided that utilize such information, For example, n approximate location may be determined for a device that is turned OFF (e.g., by utilizing the device's location history). As per another example, if a cell phone is lost and a new one replaced, information such as, for example, phone books, activity logs, and assigned user access rights may be downloaded/flashed into the cell phone.

Database 1602 may be accessed either directly (e.g., manually by an user of the device) or indirectly (e.g., periodically) by a cell phone or other device. Alternatively, a device or cell phone may access database 1602 directly (e.g., manually by an administrator of the database) or indirectly (e.g., periodically) by database 1602.

A credit card authorization system is an example of additional system 1606 that may be added to topology 1600 to realize new features. Such a credit card authorization system, as described above, could utilize a devices location in order to decrease credit card fraud. System 1600 may also be, for example, systems needed to realize the described dating functionalities or another information provider (e.g., a map information provider).

Non-wireless devices 1605 (e.g., a personal computer) may be included in topology 1600. Such devices may have locations associated to them or contain a positioning system. These locations may then be associated to a user that is recognized as using the device. For example, if a particular user logs into a non-mobile personal computer, that user's location will be recognized as being the location associated to the personal computer.

The devices of topology 1600 communicate with each other through communications network 1610. Communications network 1610 may include, for example, any type of communications, routing, amplification, encryption, decryption, parsing, modulation, or demodulation technologies. For example, positioning system 1601 may communicate with wireless device 1601 by sending multiple wireless positioning signals. At the same time, database 1602 may be providing non-wireless device 1605 with a device's location over conventional telephone wires.

Figure 17:
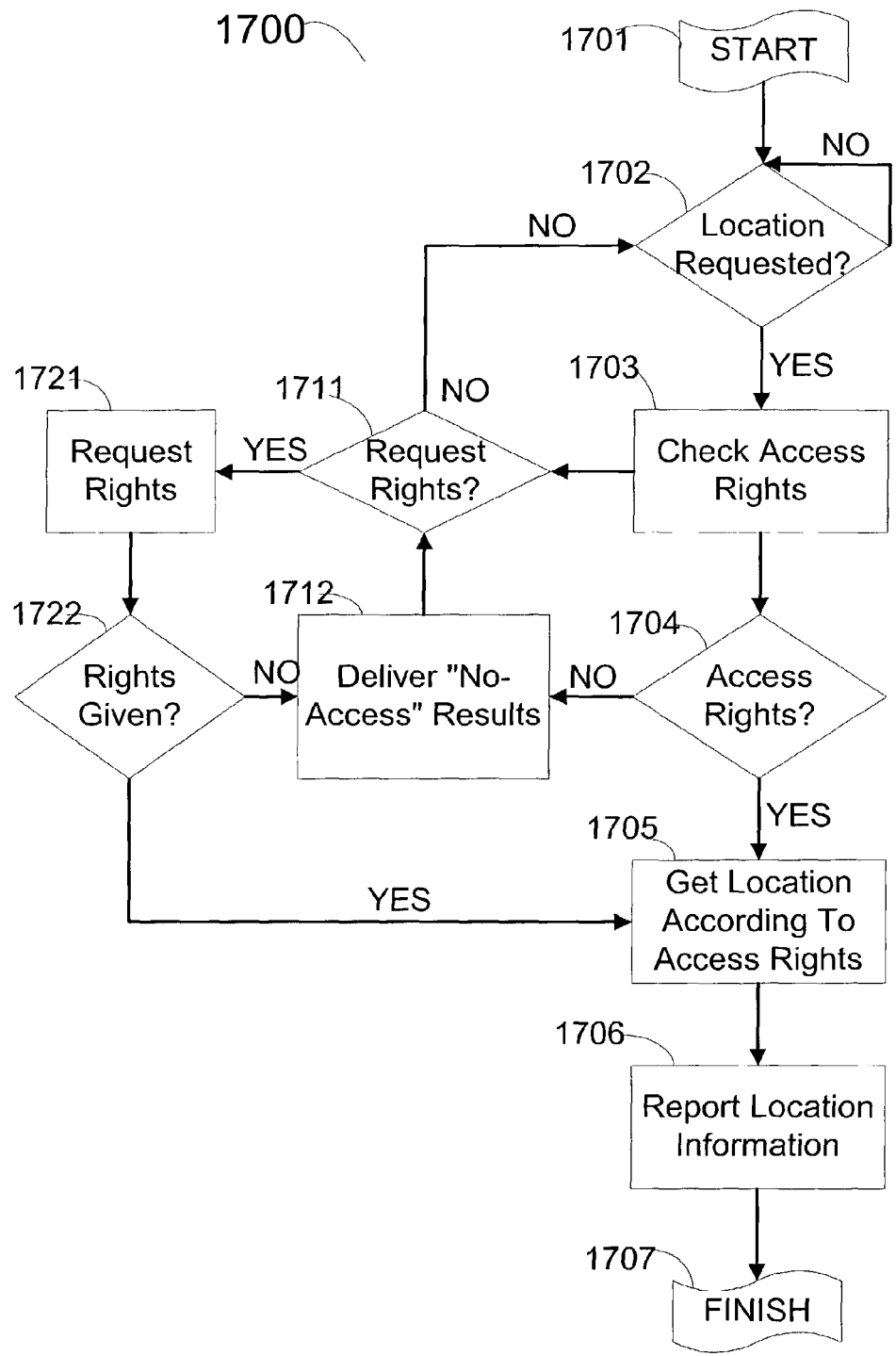
FIG. 17 is an embodiment of a locating feature in accordance with the principles of the present invention.

FIG. 17 shows locating feature 1700 in accordance with the principles of the present invention. Locating feature 1701 starts at step 1701 and waits at step 1702 until a location is requested. As stated, a location can be requested in a number of instances and by a variety of different means.

For example, a location may be requested by a user of a cell phone that desires to locate a friend by locating that friend's cell phone. Alternatively, a device may be triggered to request a location of a mobile device when an event occurs. For example, a credit card authorization system may request the location of a user's cell phone and the location of a store that just used a credit card associated to the requested user.

If a location is requested, access rights to the requested location for the requesting device and/or user are obtained at step 1703. Step 1703 may be employed for example, as a call to a database storing a list of assigned access rights for the requested device/user and finding if any access rights were assigned to the requestor's identity. As per another example, step 1703 may be employed as a direct call to the requested device/user.

Step 1704 determines if the requester has been assigned access rights to obtain the requested device/user's location. Persons skilled in the art will appreciate that some devices may always have access to a user's location regardless if a user has assigned access rights to the requesting device. In this manner, a device may be set up to always let a user access a location. For example, a mother may purchase a cell phone for a minor and may configure the cell phone to always allow her location information.

If access rights do exist for the requesting device/user at step 1704 then step 1705 may be initiated and location information may be provided to the requestor. Such location information may be filtered according to the assigned access rights. For example, if a user has only been assigned access rights to obtain the requested user's city location, only the city that the requested user/device is currently located in (or the last city location available) may be obtained. The process then finishes at step 1707 after the assigned location information has been delivered to the requester at step 1705. Persons skilled in the art will appreciate that steps may be added to, removed, or modified from locating feature 1700. For example, instead of finish step 1707, step 1702 may be initiated after step 1706 has completed.

If a requester has not been assigned rights to access the requested user/device's location as determined by step 1704, then step 1712 may be initiated. Step 1712 informs the requester that the requester does not have access rights to obtain the location of a user/device. Step 1711 may follow and provide an opportunity for the requester to obtain the access rights. More particularly, step 1711 asks the requester if the requester would like to request access rights. If the requester does not want to request access rights, locating feature 1700 may, for example, return to step 1702. Else, access rights may be requested at step 1721. Step 1722 follows and if access rights were given then step 1705 may be initiated. Else, step 1712 may, for example, be re-initiated.

Figure 18:
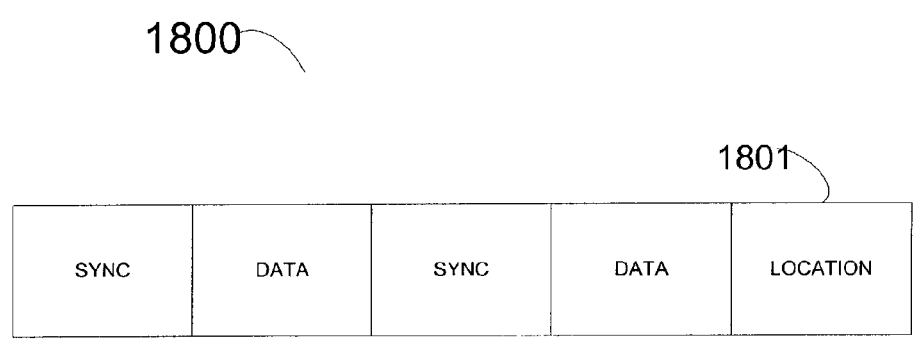
FIG. 18 is an embodiment of a communications signal in accordance with the principles of the present invention.

FIG. 18 shows one embodiment of a cell phone burst that has been configured to embed a device or user's location 1801 between control signals (e.g., synchronization signals) and data signals. Persons skilled in the art will appreciate that some cell phone burst standards (e.g., TDMA and CDMA) have signal portions that are reserved for future technologies. In one embodiment, this reserved portion is utilized to house location information 1801. A cell phone tower or base information may then strip received signals 1800 of location information 1801, store location information 1801 into a database or other storage device, and deliver the received signals to its desired location. In this manner, a user may refresh his/her location information every time that a cell phone base station receives or routes information for the user. By stripping location information 1801 from signal 1800, the intended receiver does not have access to the location of the device transmitting signal 1800. A signal similar to signal 1800 may be sent to a cell phone that has requested, and has the appropriate location access rights, to location 1801. Location 1701 may also be stored in other portions of signal 1700 that are not reserved portions. For example, a received signal 1800 may store location information in the data portions of signal 1800. In embodiments where additional information is sent about location 1801 (e.g., a map associated with location 1801) utilizing a main data portion of signal 1800 is preferred. Persons skilled in the art will appreciate that signal burst 1800 may actually be any type of communication signal such as, for example, information returned from a database inquiry.

Persons skilled in the art will also appreciate that the systems and methods of the present invention may be implemented using other locating features and configurations. For example, a user may be manually requested to allow location access rights every time his/her location is requested. As per another example, a user may organize his/her user list into groups and assign access rights to that group (e.g., family member user group, close friend user group). All such modifications are within the scope of the present invention, which is limited only by the claims that follow.

What is claimed is:

1. A system comprising:
a remote system comprising a server, the remote system capable of communicating with wireless telephones over a communications network and further capable of:
obtaining a location of a first wireless telephone;
changing, at the direction of said first wireless telephone, a list of users for a profile associated with said first wireless telephone that are allowed to access said location, wherein each user of said list of users is representative of one of a plurality of wireless telephones;
transmitting said location to at least one of said users of said list of users over said communications network;
determining a second location associated with one of said plurality of wireless telephones; and
providing directional information to said one of said plurality of wireless telephones, wherein said directional information is representative of directions between said second location and said location.

2. The system of claim 1, wherein said changing comprises adding an additional user to said list of users.

3. The system of claim 1, where said remote system is further capable of transmitting the address of said location to said at least one of said users of said list of users.

4. The system of claim 1, where said remote system is further capable of determining a third location associated with one of said plurality of wireless telephones.

5. The system of claim 1, where said remote system is further capable of determining the distance between said first wireless telephone and at least one of said plurality of wireless telephones.

6. The system of claim 1, wherein said remote system is further capable of storing access rights that allow at least one of said list of users to access said location of said first wireless telephone for an indefinite period of time.

7. The system of claim 1, wherein said remote system is further capable of storing access rights that allow at least one of said list of users to access said location of said first wireless telephone for only a specific period of time.

8. The system of claim 7, wherein said remote system is further capable of receiving an indication of said specific period of time from said first wireless telephone.

9. The system of claim 1, wherein said remote system is further capable of transmitting an alert to said one of said plurality of wireless telephones based on said location of said first wireless telephone.

10. The system of claim 9, wherein said remote system is further capable of receiving a request for said alert from said one of said plurality of wireless telephones.

11. The system of claim 10, wherein said alert is geographic area-based and said remote system is further capable of alerting said one of said plurality of wireless telephones when said location of said first wireless telephone is within a geographic area specified by said one of said plurality of wireless telephones.

12. The system of claim 1, wherein said remote system is further capable of transmitting an alert to said first wireless telephone when said one of said plurality of wireless telephones locates said first wireless telephone.

13. The system of claim 1, wherein said remote system is further capable of storing a history of locations of said first wireless telephone.

14. The system of claim 13, wherein said transmitting said location to at least one of said users of said list of users over said communications network comprises transmitting to said at least one of said users a location from said history of locations when said first wireless telephone is turned off.

15. The system of claim 1, wherein said remote system is further capable of providing said location to a device utilized by one of said users of said list of users after said one of said users of said list of users utilizes said device to input a login and password for said one of said list of users into a website.

16. The system of claim 1, wherein said remote system is further capable of storing and transmitting to said first wireless telephone a location of a watch.

17. The system of claim 16, wherein said remote system is capable of communicating with said watch over said communications network to obtain said location of said watch from a positioning system of said watch.

18. The system of claim 1, wherein said remote system is further capable of storing and transmitting to said first wireless telephone a location of a personal computer.

19. The system of claim 1, wherein said remote system is further capable of storing and transmitting to said first wireless telephone a location of a radio.

20. The system of claim 1, wherein said remote system is further capable of storing and transmitting to said first wireless telephone a location of a car.

21. The system of claim 1, wherein said remote system is further capable of providing said location of said first wireless telephone to a credit card authorization system.

22. The system of claim 1, wherein said remote system is further capable of providing to said one of said plurality of wireless telephones information indicating time to reach said location from said second location according to at least two types of travel selected from the types of travel consisting of subway, walking, running, and driving.

23. The system of claim 1, wherein said remote system is further capable of:
storing a phone book corresponding to a user of said first wireless telephone; and
downloading said phone book to a new wireless telephone of said user.

24. A system comprising:
a remote system comprising a server, the remote system capable of communicating with wireless telephones over a communications network and further capable of:
receiving from a first wireless telephone over said communications network a selection of one of a plurality of users, said selection corresponding to a user of said first wireless telephone manually selecting said one of said plurality of users from a display of said first wireless telephone, wherein each one of said plurality of users is associated to a different one of a plurality of wireless telephones;
receiving from said first wireless telephone information indicative of a login and a password;
determining whether to allow access of location information for said one of said plurality of wireless telephones associated to said selected one of said plurality of users, wherein said determining includes identifying said user of said first wireless telephone using said information indicative of said login and password and determining whether said selected one of said plurality of users has provided access rights for said location information to said user of said first wireless telephone;

determining whether said user of said first wireless telephone has assigned location access rights to said one of said plurality of wireless telephones associated with said selected one of said plurality of users for obtaining a location of said first wireless telephone; and transmitting over said communications network said location information to said first wireless telephone.

25. The system of claim 24, wherein said remote system is further capable of receiving a selection from said first wireless telephone that modifies said location access rights assigned by said user of said first wireless telephone to said one of said plurality of wireless telephones.

26. The system of claim 24, wherein said remote system is further capable of transmitting said location of said first wireless telephone to said one of said plurality of wireless telephones associated with said selected one of said plurality of users.

27. The system of claim 24, wherein said remote system is further capable of storing access rights that allow said first wireless telephone to access said location information for said one of said plurality of wireless telephones for an indefinite period of time.

28. The system of claim 24, wherein said remote system is further capable of storing access rights that allow said first wireless telephone to access said location information for said one of said plurality of wireless telephones for only a specific period of time.

29. The system of claim 28, wherein said remote system is further capable of receiving an indication of said specific period of time from said one of said plurality of wireless telephones.

30. The system of claim 24, wherein said remote system is further capable of transmitting an alert to said first wireless telephone based on said location information for said one of said plurality of wireless telephones.

31. The system of claim 30, wherein said remote system is further capable of receiving a request for said alert from said first wireless telephone.

32. The system of claim 31, wherein said alert is geographic area-based and said remote system is further capable of alerting said first wireless telephone when a location of said one of said plurality of wireless telephones is within a geographic area specified by said first wireless telephone.

33. The system of claim 24, wherein said remote system is further capable of transmitting an alert to said one of said plurality of wireless telephones when said first wireless telephone locates said one of said plurality of wireless telephones.

34. The system of claim 24, wherein said remote system is further capable of storing a history of locations of said one of said plurality of wireless telephones.

35. The system of claim 34, wherein said transmitting said location information to said first wireless telephone comprises transmitting to said first wireless telephone a location from said history of locations when said one of said plurality of wireless telephones is turned off.

36. The system of claim 24, wherein said remote system is further capable of providing said location information to another device utilized by said user of said first wireless device after said user utilizes said another device to input said login and said password into a website.

37. The system of claim 24, wherein said remote system is further capable of storing and transmitting to said first wireless telephone a location of a watch.

38. The system of claim 37, wherein said remote system is capable of communicating with said watch over said communications network to obtain said location of said watch from a positioning system of said watch.

39. The system of claim 24, wherein said remote system is further capable of storing and transmitting to said first wireless telephone a location of a personal computer.

40. The system of claim 24, wherein said remote system is further capable of storing and transmitting to said first wireless telephone a location of a radio.

41. The system of claim 24, wherein said remote system is further capable of storing and transmitting to said first wireless telephone a location of a car.

42. The system of claim 24, wherein said remote system is further capable of providing said location of said first wireless telephone to a credit card authorization system.

43. The system of claim 24, wherein said remote system is further capable of providing to said first wireless telephone information indicating time to reach a location of said one of said plurality of wireless telephones from said location of said first wireless telephone according to at least two types of travel selected from the types of travel consisting of subway, walking, running, and driving.

44. The system of claim 24, wherein said remote system is further capable of:

storing a phone book corresponding to a user of said first wireless telephone; and downloading said phone book to a new wireless telephone of said user.

45. A system comprising:

a remote system comprising a server, the remote system capable of communicating with a first wireless device and a second wireless device over a communications network and further capable of:

receiving a request for a location of said first wireless device from said second wireless device;

determining that said second wireless device does not have location access rights for said first wireless device;

after determining that said second wireless device does not have said location access rights for said first wireless device, receiving a request from said second wireless device that said location access rights be assigned for said second wireless device by said first wireless device;

receiving from said first wireless device an assignment of said location access rights for said first wireless device to said second wireless device;

storing said location access rights; and providing said location to said second wireless device dependent upon said location access rights.

46. The system of claim 45, wherein said first wireless device and said second wireless device are cellular phones.

47. The system of claim 45, wherein said location access rights include the ability to obtain said location, wherein said location is provided to said second wireless device from said server even when said first wireless device is off.

48. The system of claim 45, wherein said location access rights comprise a plurality of access levels.

49. The system of claim 45, wherein said remote system is further capable of providing to said second wireless device directions from a location of said second wireless device to said location of said first wireless device.

50. The system of claim 45, wherein said remote system is further capable of providing to said second wireless device a travel time to said location.

51. The system of claim 45, wherein said location access rights comprise a plurality of levels of access rights, at least one of said plurality of levels of access rights comprise the exact location of said first wireless device, and another one of said plurality of levels of access rights comprise an approximate location of said first wireless device.

52. The system of claim 45, wherein said access rights comprise a plurality of levels of access rights, at least one of said plurality of levels of access rights comprise an approximate location of said first wireless device, and said approximate location comprises a city or state.

53. The system of claim 45, wherein said remote system is further capable of receiving a login and password from said second wireless device to identify a user of said second wireless device.

54. The system of claim 45, wherein said remote system is further capable of:
receiving a request from said first wireless device to modify said location access rights for said second wireless device; and
modifying said location access rights for said second wireless device based on said request.

55. The system of claim 45, wherein said remote system is further capable of:
receiving a request from said first wireless device to delte said location access rights for said second wireless device; and
deleting said location access rights for said second wireless device based on said request.

56. The system of claim 45, wherein said remote system is further capable of filtering information about said location such that only a portion of location information associated with said location is transmitted to said second wireless device.

57. The system of claim 45, wherein said remote system is further capable of alerting said second wireless device when said first wireless device is within a distance of second wireless device.

58. The system of claim 45, wherein said remote system is further capable of:
receiving a request for a second location of said first wireless device from a non-wireless device, wherein said non-wireless device does not comprise a positioning system; and
providing said second location of said first wireless device to said non-wireless device in response to said request.

59. The system of claim 45, wherein said remote system is further capable of receiving said location of said first wireless device from a positioning system of said first wireless device.

60. The system of claim 45, wherein said remote system is further capable of setting at least one location alert associated with said first wireless device for a user associated with said second wireless device in response to a request from said second wireless device.

61. The system of claim 45, wherein said storing said location access rights comprises storing location access rights that allow a user of said second wireless device to access said location of said first wireless device for an indefinite period of time.

62. The system of claim 45, wherein said storing said location access rights comprises storing location access rights that allow a user of said second wireless device to access said location of said first wireless device for only a specific period of time.

63. The system of claim 62, wherein said remote system is further capable of receiving an indication of said specific period of time from said first wireless device.

64. The system of claim 45, wherein said remote system is further capable of transmitting an alert to said second wireless device based on said location of said first wireless device.

65. The system of claim 64, wherein said remote system is further capable of receiving a request for said alert from said second wireless device.

66. The system of claim 65, wherein said alert is geographic area-based and said remote system is further capable of alerting said second wireless device when said location of said first wireless device is within a geographic area specified by said second wireless device.

67. The system of claim 45, wherein said remote system is further capable of transmitting an alert to said first wireless device when said second wireless device locates said first wireless device.

68. The system of claim 45, wherein said remote system is further capable of storing a history of locations of said first wireless device.

69. The system of claim 68, wherein said providing said location to said second wireless device comprises providing to said second wireless device a location from said history of locations when said first wireless device is turned off.

70. The system of claim 45, wherein said remote system is further capable of providing said location to another device utilized by a user of said second wireless device after said user utilizes said another device to input a login and password for said user into a website.

71. The system of claim 45, wherein said remote system is further capable of storing and transmitting to said second wireless device a location of a watch.

72. The system of claim 71, wherein said remote system is capable of communicating with said watch over said communications network to obtain said location of said watch from a positioning system of said watch.

73. The system of claim 45, wherein said remote system is further capable of storing and transmitting to said second wireless device a location of a personal computer.

74. The system of claim 45, wherein said remote system is further capable of storing and transmitting to said second wireless device a location of a radio.

75. The system of claim 45, wherein said remote system is further capable of storing and transmitting to said second wireless device a location of a car.

76. The system of claim 45, wherein said remote system is further capable of providing said location of said first wireless device to a credit card authorization system.

77. The system of claim 45, wherein said remote system is further capable of providing to said second wireless device information indicating time to reach said location of said first wireless device from a second location of said second wireless device according to at least two types of travel selected from the types of travel consisting of subway, walking, running, and driving.

78. The system of claim 45, wherein said remote system is further capable of:
storing a phone book corresponding to a user of said second wireless telephone; and downloading said phone book to a new wireless telephone of said user.

\* \* \* \* \*